(12) United States Patent
Gao et al.

(10) Patent No.: US 12,175,632 B2
(45) Date of Patent: Dec. 24, 2024

(54) IMAGE PROCESSING METHOD AND APPARATUS, DEVICE, AND VIDEO PROCESSING METHOD

(71) Applicant: BOE TECHNOLOGY GROUP CO., LTD., Beijing (CN)

(72) Inventors: Yan Gao, Beijing (CN); Guannan Chen, Beijing (CN); Lijie Zhang, Beijing (CN); Wenbin Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 665 days.

(21) Appl. No.: 17/430,840

(22) PCT Filed: Sep. 30, 2020

(86) PCT No.: PCT/CN2020/119363
§ 371 (c)(1),
(2) Date: Aug. 13, 2021

(87) PCT Pub. No.: WO2022/067653
PCT Pub. Date: Apr. 7, 2022

(65) Prior Publication Data
US 2022/0164934 A1 May 26, 2022

(51) Int. Cl.
*G06T 5/50* (2006.01)
*G06T 3/4046* (2024.01)
(Continued)

(52) U.S. Cl.
CPC ............. *G06T 5/50* (2013.01); *G06T 3/4046* (2013.01); *G06T 3/4053* (2013.01); *G06V 10/40* (2022.01);
(Continued)

(58) Field of Classification Search
CPC ................... G06T 5/50; G06T 3/4046; G06T 2207/10016; G06T 2207/10024;
(Continued)

(56) References Cited

U.S. PATENT DOCUMENTS

2002/0186890 A1* 12/2002 Lee .................... H04N 19/80
375/E7.193
2018/0075581 A1 3/2018 Shi et al.
(Continued)

FOREIGN PATENT DOCUMENTS

CN 105825484 A 8/2016
CN 106980863 A 7/2017
(Continued)

OTHER PUBLICATIONS

Zhao et al. "Multi-Scale Residual Fusion Network for Super-Resolution Reconstruction of Single Image." IEEE Access, vol. 8, Aug. 20, 2020, pp. 155285-155295 (Year: 2020).*

*Primary Examiner* — Jon Chang
(74) *Attorney, Agent, or Firm* — Raj S. Dave; Dave Law Group LLC

(57) ABSTRACT

An image processing method and apparatus, a device, a video processing method and a storage medium are provided. The image processing method includes: receiving an input image; and processing the input image by using the convolutional neural network to obtain an output image. A definition of the output image is higher than a definition of the input image. Processing the input image by using the convolutional neural network to obtain the output image includes: performing feature extraction on the input image; concatenating the input image and the plurality of first images; performing the feature extraction on the first image group; fusing the plurality of second images and the plurality of first images; concatenating the input image and the
(Continued)

Obtaining an input video bitrate and an input video, wherein the input video includes a plurality of input image frames — S61

Selecting, according to the input video bitrate, a video processing sub-method corresponding to the input video bitrate to process at least one input image frame among the plurality of input image frames so as to obtain at least one output image frame, wherein the definition of the at least one output image frame is higher than the definition of the at least one input image frame and different input video bitrates correspond to different video processing sub-methods — S62 plurality of third images to obtain a second image group; and performing the feature extraction on the second image group to obtain the output image.

18 Claims, 14 Drawing Sheets

(51) Int. Cl.
    *G06T 3/4053*     (2024.01)
    *G06V 10/40*     (2022.01)
    *G06V 10/44*     (2022.01)
    *G06V 10/774*     (2022.01)
    *G06V 10/776*     (2022.01)
    *G06V 10/80*     (2022.01)
    *G06V 10/82*     (2022.01)
    *H04N 7/015*     (2006.01)
    *H04N 19/42*     (2014.01)

(52) U.S. Cl.
    CPC ........ *G06V 10/7747* (2022.01); *G06V 10/776* (2022.01); *G06V 10/803* (2022.01); *G06V 10/82* (2022.01); *H04N 7/015* (2013.01); *H04N 19/42* (2014.11); *G06T 2207/10016* (2013.01); *G06T 2207/10024* (2013.01); *G06T 2207/20081* (2013.01); *G06T 2207/20084* (2013.01); *G06T 2207/20221* (2013.01); *G06T 2207/30168* (2013.01); *G06V 10/454* (2022.01)

(58) Field of Classification Search
    CPC . G06T 2207/20081; G06T 2207/20084; G06T 2207/20221; G06T 2207/30168; G06T 3/4053; G06V 10/40; G06V 10/7747; G06V 10/776; G06V 10/803; G06V 10/82; G06V 10/454; G06V 10/806; H04N 7/015; H04N 19/42; G06N 3/04
    See application file for complete search history.

(56) References Cited

U.S. PATENT DOCUMENTS

| | | |
|---|---|---|
| 2018/0268292 A1 | 9/2018 | Choi et al. |
| 2018/0336662 A1 | 11/2018 | Kimura |
| 2020/0349681 A1* | 11/2020 | Andrei ................. G06V 10/776 |

FOREIGN PATENT DOCUMENTS

| | | |
|---|---|---|
| CN | 108898168 A | 11/2018 |
| CN | 108986050 A | 12/2018 |
| CN | 109003240 A | 12/2018 |
| CN | 109360171 A | 2/2019 |
| CN | 109509248 A | 3/2019 |
| CN | 110072119 A | 7/2019 |

\* cited by examiner

IMAGE PROCESSING METHOD AND APPARATUS, DEVICE, AND VIDEO PROCESSING METHOD

CROSS-REFERENCE TO RELATED APPLICATIONS

The present application is the U.S. National Stage Entry of PCT/CN2020/119363, filed on Sep. 30, 2020, the entire disclosure of which is incorporated herein by reference as part of the disclosure of this application.

TECHNICAL FIELD

Embodiments of the present disclosure relate to an image processing method and apparatus, a device, a video processing method and a storage medium.

BACKGROUND

Currently, deep learning technology based on artificial neural networks has made great progress in fields such as object classification, text processing, recommendation engine, image search, facial recognition, age and speech recognition, man-machine conversation, emotion calculation, etc. With the deepening of the research of artificial neural network structures and the improvement of related algorithms, the deep learning technology has made a breakthrough in the field of humanoid data perception. The deep learning technology can be used to describe image content, identify objects, which are in complex environments in images, process images according to needs, and so on.

SUMMARY

At least one embodiment of the present disclosure provides an image processing method, which is applicable to a convolutional neural network. The method comprises: receiving an input image; and processing the input image by using the convolutional neural network to obtain an output image. A definition of the output image is higher than a definition of the input image. Processing the input image by using the convolutional neural network to obtain the output image comprises: performing feature extraction on the input image to obtain a plurality of first images; concatenating the input image and the plurality of first images to obtain a first image group, the first image group comprising the input image and the plurality of first images; performing the feature extraction on the first image group to obtain a plurality of second images; fusing the plurality of second images and the plurality of first images to obtain a plurality of third images; concatenating the input image and the plurality of third images to obtain a second image group, the second image group comprising the input image and the plurality of third images; and performing the feature extraction on the second image group to obtain the output image.

For example, in the method provided by an embodiment of the present disclosure, a count of convolution kernels, used for the feature extraction on the input image, in the convolutional neural network is N, $12 \leq N \leq 20$, and N is an integer, a count of convolution kernels, used for the feature extraction on the first image group, in the convolutional neural network is M, $12 \leq M \leq 20$, and M is an integer, and a count of convolution kernels, used for the feature extraction on the second image group, in the convolution neural network is 3.

For example, in the method provided by an embodiment of the present disclosure, $N=M=16$; a size of the convolution kernels used for the feature extraction on the input image, a size of the convolution kernels used for the feature extraction on the first image group, and a size of the convolution kernels used for the feature extraction on the second image group are all 3×3; an activation function used for the feature extractions in the convolutional neural network is $y=\max(0, x)$, and x represents an input of the activation function and y represents an output of the activation function; and the input image comprises a red channel input image, a green channel input image, and a blue channel input image, and the output image comprises a red channel output image, a green channel output image, and a blue channel output image.

For example, the method provided by an embodiment of the present disclosure further comprises: training a second neural network to be trained based on a first neural network which is pre-trained to obtain the second neural network which is trained, so as to obtain the convolution neural network. Parameters of the first neural network are more than parameters of the second neural network, the first neural network which is pre-trained is configured to transform an original image having a first definition, which is input to the first neural network that is pre-trained, into a new image having a second definition, the second definition is greater than the first definition, the second neural network which is trained is the convolutional neural network, a network structure of the second neural network to be trained is same as a network structure of the convolutional neural network, and parameters of the second neural network to be trained are different from parameters of the convolutional neural network.

For example, in the method provided by an embodiment of the present disclosure, training the second neural network to be trained based on the first neural network which is pre-trained to obtain the second neural network which is trained, so as to obtain the convolutional neural network, comprises: based on the first neural network which is pre-trained, the second neural network to be trained, and a discrimination network, alternately training the discrimination network and the second neural network to obtain the second neural network which is trained, so as to obtain the convolutional neural network.

For example, in the method provided by an embodiment of the present disclosure, training the discrimination network comprises: inputting first sample data into the first neural network and the second neural network, respectively, so as to obtain first data output from the first neural network and second data output from the second neural network; setting the first data to have a true value tag, inputting the first data with the true value tag into the discrimination network to obtain a first discrimination result, setting the second data to have a false value tag, and inputting the second data with the false value tag into the discrimination network to obtain a second discrimination result; calculating a first loss function based on the first discrimination result and the second discrimination result; and adjusting parameters of the discrimination network according to the first loss function to obtain an updated discrimination network.

For example, in the method provided by an embodiment of the present disclosure, training the second neural network comprises: inputting second sample data into the first neural network and the second neural network, respectively, so as to obtain third data output from the first neural network and fourth data output from the second neural network; setting the fourth data to have a true value tag, and inputting the fourth data with the true value tag into the updated discrimination network to obtain a third discrimination result output from the discrimination network; calculating an error function based on the third data and the fourth data, calculating a discrimination function based on the third discrimination result, and calculating a second loss function based on the error function and the discrimination function; and adjusting the parameters of the second neural network according to the second loss function to obtain an updated second neural network.

For example, in the method provided by an embodiment of the present disclosure, the second loss function is a weighted sum of the error function and the discrimination function.

For example, in the method provided by an embodiment of the present disclosure, a weight of the error function is in a range of 90 to 110, and a weight of the discrimination function is in a range of 0.5 to 2.

For example, in the method provided by an embodiment of the present disclosure, the first sample data and the second sample data is image data obtained based on a plurality of videos having a same bitrate.

For example, in the method provided by an embodiment of the present disclosure, training the second neural network to be trained based on the first neural network which is pre-trained to obtain the second neural network which is trained, so as to obtain the convolutional neural network, comprises: inputting third sample data into the first neural network and the second neural network, respectively, so as to obtain fifth data output from the first neural network and sixth data output from the second neural network; calculating a third loss function based on the fifth data and the sixth data; and adjusting the parameters of the second neural network according to the third loss function to obtain an updated second neural network.

For example, in the method provided by an embodiment of the present disclosure, the first neural network comprises a plurality of stages of down-sampling units and a plurality of stages of up-sampling units corresponding to the plurality of stages of down-sampling units, an output of each stage of down-sampling unit serves as an input of a next stage of down-sampling unit, and an input of each stage of up-sampling unit comprises an output of a stage of down-sampling unit corresponding to the stage of up-sampling unit and an output of a previous stage of up-sampling unit of the stage of up-sampling unit.

At least one embodiment of the present disclosure further provides a terminal device, which comprises a processor. The processor is configured to: obtain an input video bitrate and an input video, the input video comprising a plurality of input image frames; and select, according to the input video bitrate, a video processing method corresponding to the input video bitrate to process at least one input image frame among the plurality of input image frames so as to obtain at least one output image frame, a definition of the at least one output image frame being higher than a definition of the at least one input image frame. Different input video bitrates correspond to different video processing methods.

For example, in the terminal device provided by an embodiment of the present disclosure, the video processing method comprises: processing the at least one input image frame based on a trained neural network to obtain the at least one output image frame. Processing the at least one input image frame based on the trained neural network to obtain the at least one output image frame comprises: performing feature extraction on the at least one input image frame to obtain a plurality of first output images; concatenating the at least one input image frame and the plurality of first output images to obtain a first output image group, in which the first output image group comprises the at least one input image frame and the plurality of first output images; performing the feature extraction on the first output image group to obtain a plurality of second output images; fusing the plurality of second output images and the plurality of first output images to obtain a plurality of third output images; concatenating the at least one input image frame and the plurality of third output images to obtain a second output image group, in which the second output image group comprises the at least one input image frame and the plurality of third output images; and performing the feature extraction on the second output image group to obtain the at least one output image frame.

For example, in the terminal device provided by an embodiment of the present disclosure, trained neural networks corresponding to different video processing methods are different.

For example, in the terminal device provided by an embodiment of the present disclosure, the trained neural networks corresponding to different video processing methods are trained by using different sample data sets, the different sample data sets are obtained based on different video sets, each video set comprises a plurality of videos, videos in a same video set have a same bitrate, and videos in different video sets have different bitrates.

At least one embodiment of the present disclosure further provides a video processing method, which comprises: obtaining an input video bitrate and an input video, the input video comprising a plurality of input image frames; and selecting, according to the input video bitrate, a video processing sub-method corresponding to the input video bitrate to process at least one input image frame among the plurality of input image frames so as to obtain at least one output image frame, a definition of the at least one output image frame being higher than a definition of the at least one input image frame. Different input video bitrates correspond to different video processing sub-methods.

At least one embodiment of the present disclosure further provides an image processing apparatus, which comprises: a processor; and a memory, comprising one or a plurality of computer program modules. The one or plurality of computer program modules are stored in the memory and configured to be executed by the processor, and the one or plurality of computer program modules are configured to execute the image processing method according to any one of the embodiments of the present disclosure.

At least one embodiment of the present disclosure further provides a storage medium, for storing non-transitory computer readable instructions. Upon the non-transitory computer readable instructions being executed by a computer, the image processing method according to any one of the embodiments of the present disclosure is executed.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the absolute position of the object which is described is changed, the relative position relationship may be changed accordingly.

With the development of deep learning technology, deep learning technology has been more and more widely used in the field of image enhancement. Image enhancement technology based on deep learning can be used for image processing, such as image denoising, image restoration, image deblurring, image super-resolution enhancement, image deraining/defogging, and so on.

Figure 1:
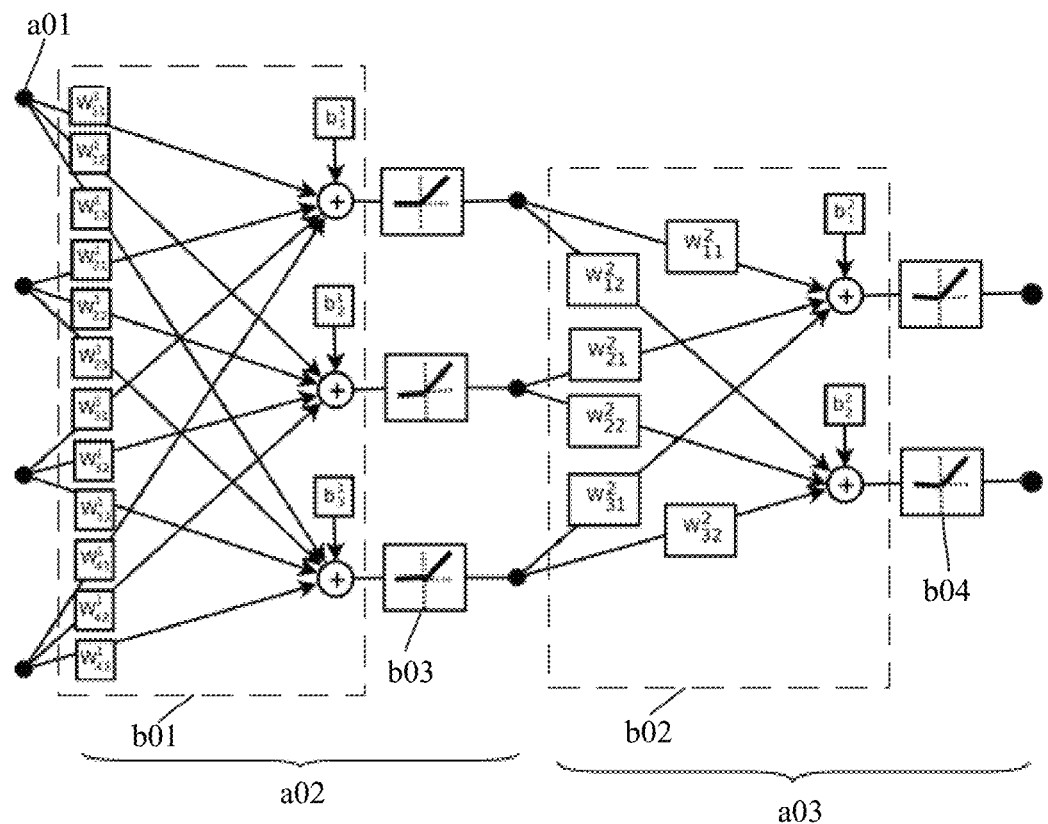
FIG. 1 is a schematic diagram of a convolutional neural network.

The convolutional neural network (CNN) is a common neural network structure which can be used for image processing. FIG. 1 is a schematic diagram of a CNN. For example, the CNN can be used for image processing, which uses images as input and output, and replaces scalar weights by convolution kernels. FIG. 1 only shows a CNN having a 3-layered structure, and the embodiments of the present disclosure are not limited to this case. As shown in FIG. 1, the CNN includes an input layer a01, a hidden layer a02, and an output layer a03. The input layer a01 has 4 inputs; the hidden layer a02 has 3 outputs; the output layer a03 has 2 outputs, and the CNN finally outputs 2 images. For example, the hidden layer a02, which is also referred to as an intermediate layer, is mainly used to extract features, and neurons therein can take various forms to form bias to the output results.

For example, the 4 inputs of the input layer a01 can be 4 images or 4 features of 1 image. The 3 outputs of the hidden layer a02 can be feature images of images inputted through the input layer a01.

For example, as shown in FIG. 1, the hidden layer a02 includes a first convolution layer b01 and a first activation layer b03. In the present example, convolution layers have weight $w_{ij}^k$ and bias $b_i^k$. The weight $w_{ij}^k$ represents a convolution kernel, and the bias $b_i^k$ is a scalar superimposed on the output of the convolution layer, where k is the label indicating the serial number of the input layer a01 or the hidden layer a02, and i and j are the labels of units in two connected layers, respectively. For example, the first convolution layer b01 includes a first set of convolution kernels ($w_{ij}^1$ in FIG. 1) and a first set of biases ($b_i^1$ in FIG. 1). Similarly, the output layer a03 includes a second convolution layer b02 and a second activation layer b04. The second convolution layer b02 includes a second set of convolution kernels ($w_{ij}^2$ in FIG. 1) and a second set of biases ($b_i^2$ in FIG. 1). In general, each convolution layer includes dozens or hundreds of convolution kernels. If being a deep CNN, the CNN may include at least five convolution layers.

For example, as shown in FIG. 1, the first activation layer b03 is disposed after the first convolution layer b01, and the second activation layer b04 is disposed after the second convolution layer b02. The activation layer includes an activation function. The activation function is used to introduce nonlinear factors into the CNN, so that the CNN can solve complex problems better. The activation function can include a rectified linear unit function (ReLU function), a Sigmoid function, or a hyperbolic tangent function (tanh function), etc. The ReLU function is an unsaturated nonlinear function, and the Sigmoid function and the tanh function are saturated nonlinear functions. For example, the activation layer can be used alone as one layer of the CNN, or the activation layer can also be included in a convolution layer.

For example, in the first convolution layer b01, firstly, the output of the first convolution layer b01 is obtained by applying a plurality of convolution kernels $w_{ij}^1$ in the first set of convolution kernels and a plurality of biases $b_j^1$ in the first set of biases to each input; and then, the output of the first convolution layer b01 can be processed by the first activation layer b03, so as to obtain the output of the first activation layer 03. In the second convolution layer b02, firstly, the output of the second convolution layer b02 is obtained by applying a plurality of convolution kernels $w_{ij}^2$ in the second set of convolution kernels and a plurality of biases $b_i^2$ in the second set of biases to the output of the first activation layer b03; and then, the output of the second convolution layer b02 can be processed by the second activation layer b04, so as to obtain the output of the second activation layer b04. For example, the output of the first convolution layer b01 may be a result of applying the convolution kernels $w_{ij}^1$ to the input of the first convolution layer b01 and then adding the biases $b_i^1$, and the output of the second convolution layer b02 may be a result of applying the convolution kernels $w_{ij}^2$ to the output of the first activation layer b03 and then adding the biases $b_i^2$.

The CNN needs to be trained before being used for image processing. After being trained, the convolution kernels and the biases of the CNN remain unchanged during image processing. In the training process, the convolution kernels and the biases are adjusted by using multiple sets of input/output sample images and optimization algorithms, so as to obtain an optimized CNN model.

In the field of video playback, due to the limitation of transmission bandwidth, the picture quality of the video played on the TV used by the user is poor. There are two main reasons for poor picture quality. On the one hand, the resolution of the video image is low, and the resolution of TV channel or Internet video is usually standard definition (360p or 720p), and when the user's TV screen is of 4K resolution (2160p), the video image needs to be interpolated and enlarged, resulting in a large loss of detail information. On the other hand, due to the requirements of live video transmission bandwidth and video storage space, the original video needs to be compressed at a low bitrate, and the compressed video also loses a lot of detail information and introduces a lot of noise.

As the central control component of smart TV, a terminal video processor can operate the basic functions of TV, and can also have the functions of voice control and program recommendation. With the increasing computing power of the chip, the terminal video processor can integrate video image enhancement function to solve the problem of poor picture quality of videos. However, the video image enhancement function of the terminal video processor is still dominated by traditional simple algorithms, and the picture quality enhancement capability is limited. Deep learning algorithms (such as convolutional neural networks) have a large amount of computation, so it is difficult for the terminal video processor to support the computation of common convolutional neural networks.

Therefore, how to design a convolutional neural network with a simple structure and related training methods to improve the definition of the image, so that the convolutional neural network can not only have better image enhancement function, but also be easily deployed on a terminal device, has become an urgent problem to be solved.

At least one embodiment of the present disclosure provides an image processing method and apparatus, a terminal device, a video processing method and a storage medium. The convolutional neural network required by the image processing method is simple in structure, which can save the computing power of device, remove the noise of low-quality images and videos, improve the definition of the picture, realize real-time picture quality enhancement, and facilitate deployment on the terminal devices. The image processing method provided by at least one embodiment also has a good neural network training effect.

Hereinafter, some embodiments of the present disclosure will be described in detail with reference to the accompanying drawings. It should be noted that the same reference numerals in different drawings are used to refer to the same elements already described.

At least one embodiment of the present disclosure provides an image processing method, which is applicable to a convolutional neural network. The image processing method includes: receiving an input image; and processing the input image by using the convolutional neural network to obtain an output image. The definition of the output image is higher than the definition of the input image. Processing the input image by using the convolutional neural network to obtain the output image includes: performing feature extraction on the input image to obtain a plurality of first images; concatenating the input image and the plurality of first images to obtain a first image group, the first image group including the input image and the plurality of first images; performing the feature extraction on the first image group to obtain a plurality of second images; fusing the plurality of second images and the plurality of first images to obtain a plurality of third images; concatenating the input image and the plurality of third images to obtain a second image group, the second image group including the input image and the plurality of third images; and performing the feature extraction on the second image group to obtain the output image.

It should be noted that, in the embodiments of the present disclosure, "definition", for example, refers to the sharpness of each detail texture and boundaries thereof in an image, and the higher the definition, the better the sensory effect of human eyes. The definition of the output image being higher than the definition of the input image, for example, refers to that, through processing, such as denoising and/or deblurring, the input image by using the image processing method provided by the embodiments of the present disclosure, the output image obtained after the processing is more definite than the input image.

Figure 2:
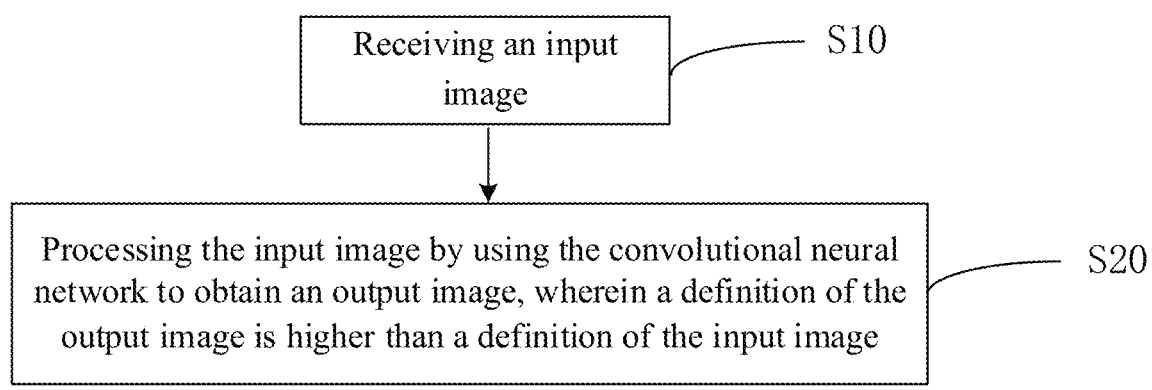
FIG. 2 is a schematic flowchart of an image processing method provided by some embodiments of the present disclosure.

FIG. 2 is a schematic flowchart of an image processing method provided by some embodiments of the present disclosure. For example, the image processing method is applicable to a convolutional neural network, that is, the image processing method uses the convolutional neural network to realize image processing. For example, as shown in FIG. 2, the image processing method includes following operations.

Step S10: receiving an input image; and

Step S20: processing the input image by using the convolutional neural network to obtain an output image, in which a definition of the output image is higher than a definition of the input image.

For example, in step S10, the input image may be an image to be processed, for example, an image with low definition. The image to be processed can be a video frame extracted from a video, a picture downloaded through a network or taken by a camera, or an image obtained by other means, without being limited in the embodiments of the present disclosure. For example, there is a lot of noise in the input image, and the picture quality is relatively fuzzy, so it is necessary to use the image processing method provided by the embodiments of the present disclosure for denoising and/or deblurring, so as to improve the definition and enhance the picture quality. For example, in the case where the input image is a color image, the input image may include a red (R) channel input image, a green (G) channel input image and a blue (B) channel input image. Here, the input image is a color image which includes 3 channels of RGB.

For example, in step S20, the convolutional neural network can be used to realize image processing, such as performing denoising and/or deblurring on the input image, so that the definition of the output image is higher than the definition of the input image. For example, in the case where the input image include a red (R) channel input image, a green (G) channel input image and a blue (B) channel input image, the output image may include a red (R) channel output image, a green (G) channel output image and a blue (B) channel output image. Here, the output image is a color image which includes 3 channels of RGB.

Figure 3A:
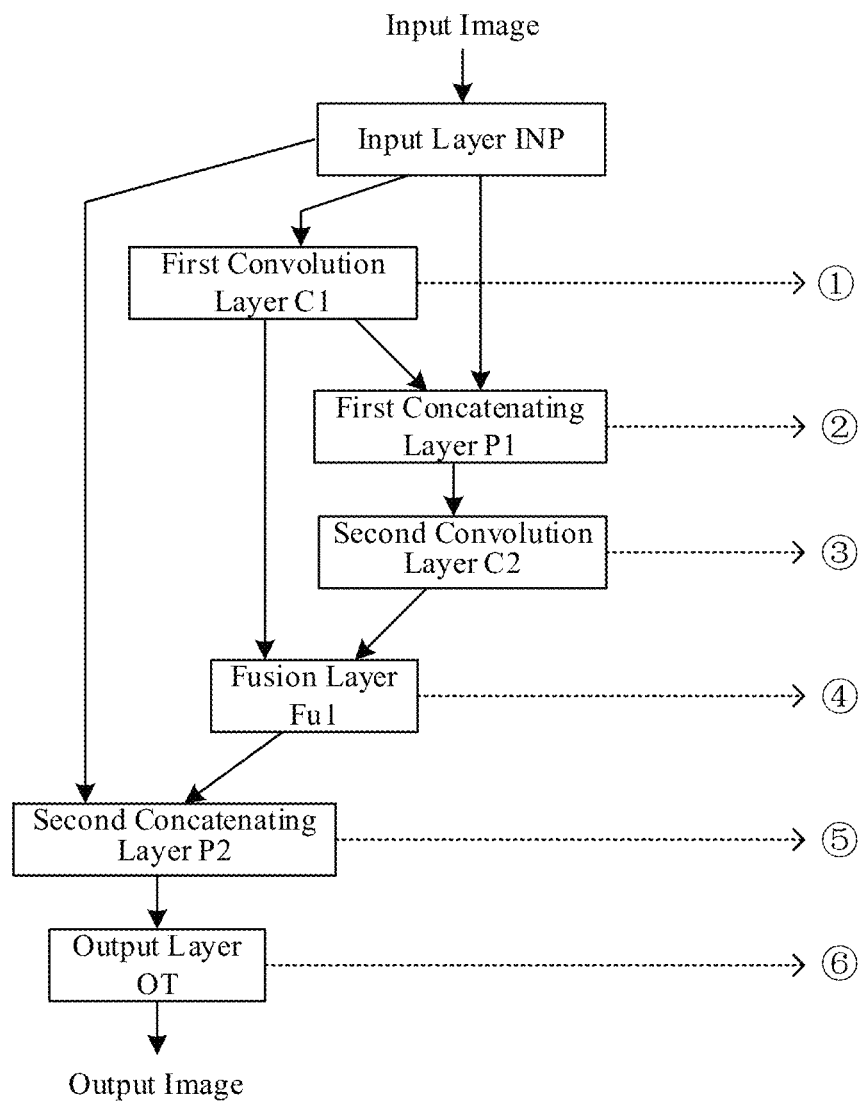
FIG. 3A is a schematic diagram of a convolutional neural network used in an image processing method provided by some embodiments of the present disclosure.

FIG. 3A is a schematic diagram of a convolutional neural network used in an image processing method provided by some embodiments of the present disclosure. For example, in the image processing method provided by the embodiments of the present disclosure, the input image is input into the convolutional neural network shown in FIG. 3A, and the convolutional neural network processes the input image to obtain an output image, thereby completing the image processing, so that the definition of the output image is higher than the definition of the input image.

For example, as shown in FIG. 3A, the convolutional neural network includes an input layer INP, a first convolution layer C1, a first concatenating layer P1, a second convolution layer C2, a fusion layer Fu1, a second concatenating layer P2, and an output layer OT, which are sequentially arranged.

For example, the input layer INP is used to receive the input image. In the case where the input image is a black-and-white image, the input image includes one channel. In the case where the input image is an RGB color image, the input image includes three channels, that is, the input image is one image, but includes a red (R) channel input image, a green (G) channel input image and a blue (B) channel input image.

The first convolution layer C1 is used to perform convolution operation on the input image received by the input layer INP, so as to realize feature extraction. For example, the first convolution layer C1 includes a plurality of convolution kernels, a plurality of biases and an activation function, so that a plurality of feature images (also referred to as feature maps) can be obtained by calculation. The activation function is used to perform nonlinear mapping on the result of the convolution operation, so as to help express complex features. For example, the activation function in the first convolution layer C1 adopts the rectified linear unit function (ReLU function), and by using the ReLU function, the convolutional neural network is easier to converge and has better prediction performance. The ReLU function can be expressed as: $y=\max(0, x)$, where x represents the input of the ReLU function and y represents the output of the ReLU function. Of course, the embodiments of the present disclosure are not limited to this case, and the activation function can also adopt the Sigmoid function, the hyperbolic tangent function (tanh function) or any other suitable function, which can be determined according to actual requirements.

The first concatenating layer P1 is used to take the input image received by the input layer INP and the feature images output by the first convolution layer C1 jointly as the input of the second convolution layer C2. That is, the first concatenating layer P1 is used to concatenate the input image received by the input layer INP and the feature images output by the first convolution layer C1, and the feature images obtained by the concatenating operation serve as the input of the second convolution layer C2. For example, the first concatenating layer P1 may adopt a concat function, and the concat function, for example, can be expressed as: concat (str1, str2, . . . )=(str1, str2, . . . ), where str1 represents the first image participating in the concatenating operation, str2 represents the second image participating in the concatenating operation, and so on. The concat function does not change the content of each image, but only returns a concatenated copy of the plurality of images. The specific description of the concat function can refer to conventional design, and is not redundantly described here. Therefore, the information of the input image can be linked with the information of the feature images output by the first convolution layer C1, so that the feature images input to the second convolution layer C2 contain the information of the input image (that is, contain the information of the original image).

The second convolution layer C2 is used to perform convolution operation on the feature images output by the first concatenating layer P1, so as to realize feature extraction. For example, the second convolution layer C2 includes a plurality of convolution kernels, a plurality of biases and an activation function, so that a plurality of feature images can be obtained by calculation. For example, the activation function in the second convolution layer C2 can also adopt the ReLU function. Of course, the embodiments of the present disclosure are not limited to this case, and the activation function in the second convolution layer C2 can also adopt the Sigmoid function, the tanh function or any other suitable function, which can be determined according to actual requirements. The activation function in the first convolution layer C1 and the activation function in the second convolution layer C2 can be the same or different, which may be determined according to actual requirements, without being limited in the embodiments of the present disclosure.

The fusion layer Fu1 is used to fuse the feature images output by the second convolution layer C2 with the feature images output by the first convolution layer C1. The fusion layer Fu1 can fuse the features of different layers in the convolutional neural network. For example, these different layers can be two connected layers, that is, the output of one layer serves as the input of the other layer; and these different layers can also be two layers spaced apart, that is, the output of one layer is not used as the input of the other layer. For example, any suitable fusion algorithm can be adopted to realize the fusion of feature images, without being limited in the embodiments of the present disclosure.

The second concatenating layer P2 is used to take the input image received by the input layer INP and the feature images output by the fusion layer Fu1 as the input of the output layer OT. That is, the second concatenating layer P2 is used to concatenate the input image received by the input layer INP and the feature images output by the fusion layer Fu1, and the feature images obtained by the concatenating operation serve as the input of the output layer OT. For example, the second concatenating layer P2 can adopt the concat function, and the concat function does not change the content of each image, but only returns a concatenated copy of the plurality of images. Therefore, the information of the input image can be linked with the information of the feature images output by the fusion layer Fu1, so that the feature images input to the output layer OT contain the information of the input image (that is, contain the information of the original image).

The output layer OT is used to perform convolution operation on the feature images output by the second concatenating layer P2, so as to convert the feature images into a multi-channel or single-channel image that meets the requirements, and output the image obtained by the operation as the output image of the convolutional neural network. For example, the output layer OT can perform convolution operation to realize feature extraction and channel conversion. For example, the output layer OT includes a plurality of convolution kernels, a plurality of biases, and an activation function, so that a feature image can be obtained by calculation and serves as the output image. For example, the activation function in the output layer OT can also adopt the ReLU function. Of course, the embodiments of the present disclosure are not limited to this case, and the activation function in the output layer OT can also adopt the Sigmoid function, the tanh function or any other suitable function, which can be determined according to actual requirements. For example, the output layer OT can further include a fully connected layer, and the fully connected layer is used for nonlinear combination of the extracted features, so as to obtain an output.

It should be noted that in the embodiments of the present disclosure, the convolutional neural network described above can further include more types of operation layers, and for example, it can further include a pooling layer, etc., without being limited in the embodiments of the present disclosure. For example, the convolution layers is not limited to two layers (not limited to the first convolution layer C1 and the second convolution layer C2), and more convolution layers such as a third convolution layer and a fourth convolution layer may be provided. Similarly, the concatenating layers are not limited to two layers (not limited to the first concatenating layer P1 and the second concatenating layer P2), and more concatenating layers such as a third concatenating layer and a fourth concatenating layer may be provided. Similarly, the fusion layer is not limited to one layer, and more fusion layers can be provided.

It should be noted that, in the embodiments of the present disclosure, the first convolution layer C1, the second convolution layer C2 and the output layer OT can also be used for pixel filling before convolution operation, so that the size of the image input to one layer is the same as the size of the image output from the layer. The detailed description of pixel filling can refer to the conventional design, and is not redundantly described here.

In the convolutional neural network, a plurality of concatenating layers (e.g., the first concatenating layer P1 and the second concatenating layer P2) are provided to link the information of the feature images in the convolutional neural network with the information of the input image, so that the feature images in the subsequent processing procedure contain the information of the input image (i.e., contain the information of the original image), thus making the convolutional neural network have a good detail restoring effect. In the case where the convolutional neural network is trained to have the function of denoising and/or deblurring, the denoising and/or deblurring effect thereof is very nice, thus effectively improving the definition of the image and realizing image enhancement. The convolutional neural network is simple in structure and easy to implement in operation, which can effectively save the computing power, improve operation efficiency, facilitate deployment on the terminal device, and is suitable for real-time image enhancement on the mobile terminal.

Figure 3B:
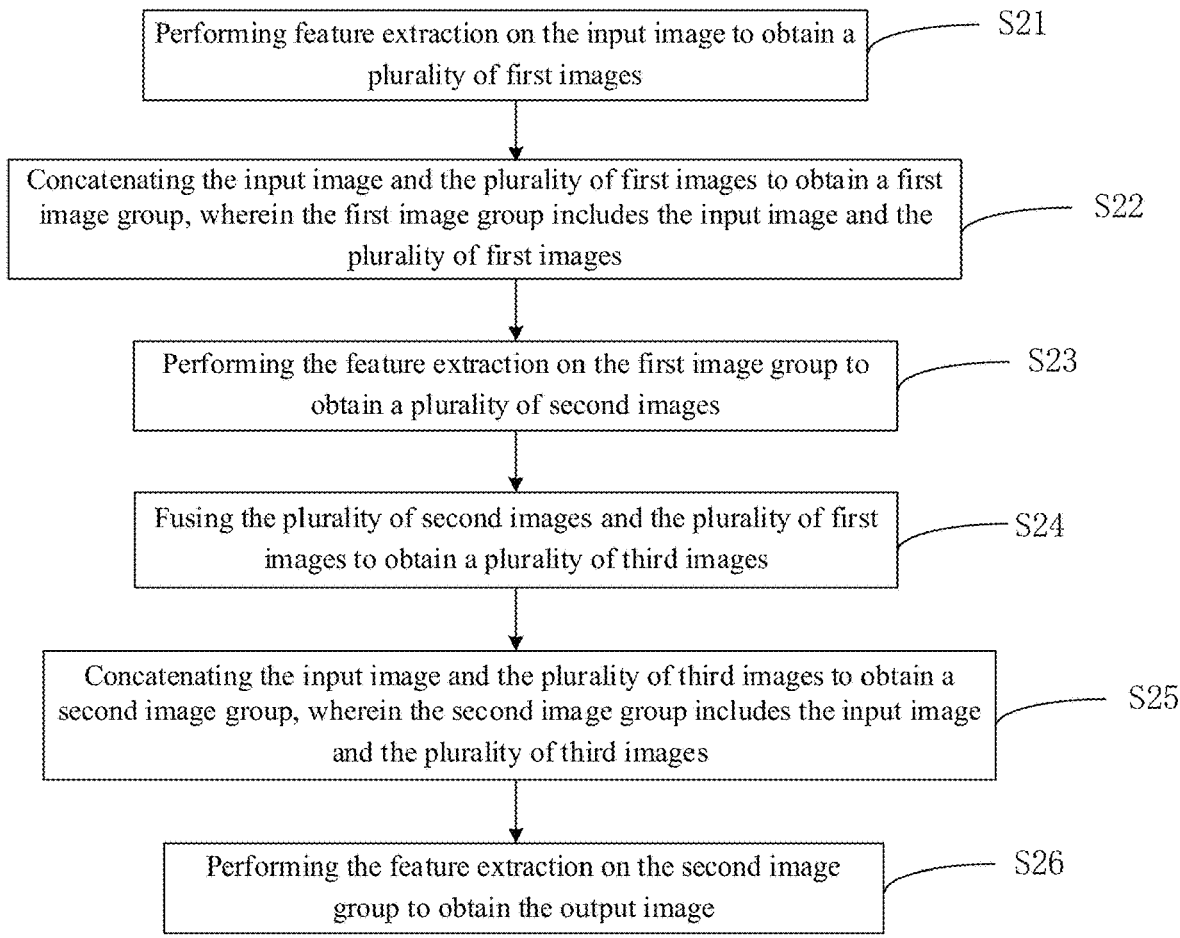
FIG. 3B is a schematic flowchart of step S20 in the image processing method shown in FIG. 2.

FIG. 3B is a schematic flowchart of step S20 in the image processing method shown in FIG. 2. For example, as shown in FIG. 3B, in some examples, step S20 shown in FIG. 2 can specifically include following operations.

Step S21: performing feature extraction on the input image to obtain a plurality of first images;

Step S22: concatenating the input image and the plurality of first images to obtain a first image group, the first image group including the input image and the plurality of first images;

Step S23: performing the feature extraction on the first image group to obtain a plurality of second images;

Step S24: fusing the plurality of second images and the plurality of first images to obtain a plurality of third images;

Step S25: concatenating the input image and the plurality of third images to obtain a second image group, the second image group including the input image and the plurality of third images; and Step S26: performing the feature extraction on the second image group to obtain the output image.

For example, the above steps S21-S26 can be realized by the convolutional neural network shown in FIG. 3A, and steps S21-S26 are illustratively described below with reference to the convolutional neural network shown in FIG. 3A.

For example, in step S21, the first convolution layer C1 is used to perform the feature extraction on the input image to obtain a plurality of first images. For example, the input image may be an RGB color image, and the input image includes three channels. That is, the input image is one image, but includes a red (R) channel input image, a green (G) channel input image and a blue (B) channel input image. The first images are feature images (also referred to as feature maps) obtained after being processed by the first convolution layer C1. For example, the number of convolution kernels (that is, convolution kernels in the first convolution layer C1), used for the feature extraction on the input image, in the convolution neural network is N, $12 \leq N \leq 20$, and N is an integer. For example, in some examples, N=16, that is, the first convolution layer C1 has 16 convolution kernels, and in this case, the number of the plurality of first images obtained by calculation via the first convolution layer C1 is also 16.

For example, in step S22, the first concatenating layer P1 is used to perform the concatenating operation on the input image and the plurality of first images to obtain a first image group. Here, "concatenating operation" refers to concatenating a plurality of images by using, for example, the concat function. The concat function does not change the content of each image, but only returns a concatenated copy of a plurality of images. For example, the first image group includes the input image and the plurality of first images. For example, in some examples, in the case where the input image has three channels and the first convolution layer C1 has 16 convolution kernels, the number of the first images is 16, and the first image group is obtained by concatenating the three channels of the input image with the 16 first images. The first image group includes 19 images, of which 16 are feature images output by the first convolution layer C1 (i.e., the first images described above), and 3 are the three channels of the input image.

For example, in step S23, the second convolution layer C2 is used to perform the feature extraction on the first image group to obtain a plurality of second images. For example, the second images are feature images (also referred to as feature maps) obtained after being processed by the second convolution layer C2. For example, the number of convolution kernels (that is, convolution kernels in the second convolution layer C2), used for the feature extraction on the first image group, in the convolution neural network is M, 12≤M≤20, and M is an integer. For example, in some examples, M=16, that is, the second convolution layer C2 has 16 convolution kernels, and in this case, the number of the plurality of second images obtained by calculation via the second convolution layer C2 is also 16.

It should be noted that M and N may be equal or unequal, that is, the number of convolution kernels in the second convolution layer C2 and the number of convolution kernels in the first convolution layer C1 can be equal or unequal, which can be determined according to actual requirements, without being limited in the embodiments of the present disclosure. For example, in some examples, the number of convolution kernels in the first convolution layer C1 and the number of convolution kernels in the second convolution layer C2 are both 16, which can not only take into account the magnitude of operations that the mobile terminal can undertake, but also have a good image processing effect.

For example, in step S24, in some examples, the fusion layer Fu1 is used to process the plurality of second images to obtain a plurality of third images. That is, the plurality of second images and the plurality of first images are fused by using the fusion layer Fu1 to obtain the plurality of third images. For example, in some examples, in the case where the first convolution layer C1 has 16 convolution kernels and the second convolution layer C2 also has 16 convolution kernels, the number of the first images is 16, the number of the second images is also 16, and the first images and the second images can form a one-to-one correspondence relationship. In this case, the fusing process can be, for example, performing an addition operation on corresponding pixels in the corresponding first image and second image.

It should be noted that, in the embodiments of the present disclosure, in step S24, it is not limited to use the fusion layer Fu1 to obtain the third image, and the third image can also be obtained by processing the second image using any computing layer such as one or more convolution layers, one or more concatenating layers and one or more pooling layers, without being limited in the embodiments of the present disclosure.

For example, in step S25, the second concatenating layer P2 is used to perform concatenating operation on the input image and the plurality of third images to obtain a second image group. Here, "concatenating operation" refers to concatenating a plurality of images by using, for example, the concat function. The concat function does not change the content of each image, but only returns a concatenated copy of the plurality of images. For example, the second image group includes the input image and the plurality of third images. For example, in some examples, in the case where the input image has three channels and both the first convolution layer C1 and the second convolution layer C2 have 16 convolution kernels, the second image group includes 19 images, of which 16 are feature images output by the fusion layer Fu1, and 3 are the three channels of the input image.

For example, in step S26, the output layer OT is used to perform feature extraction on the second image group to obtain an output image. For example, the output layer OT is used to convert the second image group into a multi-channel or single-channel image that meets the requirements. For example, the output image is a feature image obtained after being processed by the output layer OT. For example, the number of convolution kernels (that is, convolution kernels in the output layer OT), used for the feature extraction on the second image group, in the convolutional neural network is 3, and in this case, the number of output images obtained by calculation via the output layer OT is also 1, but the output image includes images of three channels: a red (R) channel output image, a green (G) channel output image and a blue (B) channel output image. It should be noted that in the case where the input image has only one channel, correspondingly, the number of convolution kernels in the output layer OT is also 1, so that the obtained output image also has one channel.

For example, in some examples, the sizes of convolution kernels in the first convolution layer C1, the sizes of convolution kernels in the second convolution layer C2, and the sizes of convolution kernels in the output layer OT are all 3×3, which can meet the requirements of feature extraction and also take into account the computational resources. Of course, the embodiments of this present disclosure are not limited to this case, and the size of the convolution kernel can be an arbitrary size, such as 4×4, 5×5, etc., and the sizes of convolution kernels in the first convolution layer C1, the sizes of convolution kernels in the second convolution layer C2, and the sizes of convolution kernels in the output layer OT can be the same or different, which can be determined according to actual requirements, without being limited in the embodiments of the present disclosure.

For example, in some examples, the input image has three channels, namely a red channel input image, a green channel input image and a blue channel input image. It can be set that both the first convolution layer C1 and the second convolution layer C2 include 16 convolution kernels, the output layer OT includes 3 convolution kernels, and the sizes of the convolution kernels are all 3×3. In this example, the batch size of the network is set to be batchsize=1 and the convolution kernel stride is set to be stride=1, that is, the size of the feature image is not changed, thus making the operation and process more simply. It should be noted that the batch size and the convolution kernel stride are not limited to 1, but can be other values, which can be determined according to actual requirements.

As shown in FIG. 3A, after passing through the first convolution layer C1, the image changes from 3 channels to 16 channels (①), and the width and height information remain unchanged. Here, multiple "channels" can refer to multiple feature images. Before the second convolution layer C2 starts to calculate, the first concatenating layer P1 links the information of the original image to the calculation result of the first convolution layer C1 (②), and transmits them to the second convolution layer C2 as a mutual input. The fusion layer Fu1 fuses the output of the second convolution layer C2 (③) with the output of the first convolution layer C1 (④), then the second concatenating layer P2 links the information of the original image (⑤), and then transmits them to the output layer OT. The output layer OT learns the information of three channels RGB, and the output of the output layer OT is RGB image information (⑥).

For example, the output result of each layer can be expressed as (B, H, W, F), where B represents batch size, H represents image height, W represents image width, and F represents the number of feature images. The output results of the above stages are as follows: ①1*H*W*16, ②1*H*W*19, ③1*H*W*16, ④1*H*W*16, ⑤1*H*W*19, ⑥1*H*W*3.

After the process of steps S21-S26 described above, the input image is processed and the output image is obtained by using the convolutional neural network, and the definition of the output image is higher than the definition of the input image, thus realizing image enhancement.

Figure 4:
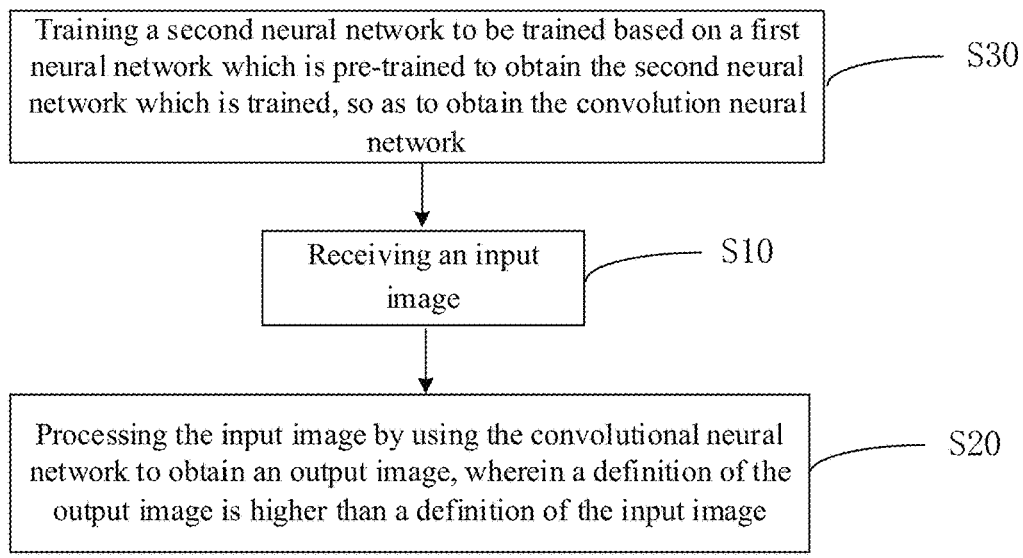
FIG. 4 is a schematic flowchart of another image processing method provided by some embodiments of the present disclosure.

FIG. 4 is a schematic flowchart of another image processing method provided by some embodiments of the present disclosure. For example, as shown in FIG. 4, the image processing method provided by the present embodiment is basically the same as the image processing method shown in FIG. 2, except that step S30 is further included. Similar steps S10-S20 can refer to the foregoing contents, and may not be redundantly described here.

In the present embodiment, before executing steps S10-S20, the image processing method further includes the following operation.

Step S30: training a second neural network to be trained based on a first neural network which is pre-trained to obtain the second neural network which is trained, so as to obtain the convolution neural network.

For example, the parameters of the first neural network are more than the parameters of the second neural network, and the first neural network which is pre-trained is configured to transform an original image having a first definition, which is input to the pre-trained first neural network, into a new image having a second definition, and the second definition is greater than the first definition. That is, the first neural network has the function of improving the definition of the image.

For example, in some examples, step S30 can include: based on the first neural network which is pre-trained, the second neural network to be trained, and a discrimination network, alternately training the discrimination network and the second neural network to obtain the second neural network which is trained, so as to obtain the convolutional neural network.

For example, the second neural network which is trained is the convolutional neural network described above. The network structure of the second neural network to be trained is the same as the network structure of the convolutional neural network. Here, the network structure can refer to the number, arrangement manner and arrangement sequence of layers of the network, and can also refer to the means and manners of data transmission in the network. The parameters of the second neural network to be trained are different from the parameters of the convolutional neural network. That is, the convolutional neural network described above can be obtained by training the second neural network to be trained and optimizing parameters thereof. For example, the parameters of the second neural network and the parameters of the convolutional neural network both include the weight parameters in each convolutional layer. For example, the greater the absolute value of a weight parameter, the greater the contribution of the neuron corresponding to the weight parameter to the output of the neural network, and thus the more important it is to the neural network.

For example, the pre-trained first neural network can be trained in the following way. Firstly, a true value sample (i.e., an input video with high definition and including a plurality of input image frames) is obtained, and a corresponding output video with low definition (including a plurality of output image frames) is obtained by processing the true value sample (e.g., adding noise, blurring, etc.), and the plurality of output image frames are in one-to-one correspondence with the plurality of input image frames. Then, the corresponding input image frame and output image frame are used as one group of training pairs to train an untrained first neural network, so as to obtain the trained first neural network. For example, the plurality of input image frames and/or the plurality of output image frames obtained at this stage can be used as training samples for the subsequent training of the second neural network.

For example, in some examples, in step S30, the sample data is input into the first neural network and the second neural network, and based on the output results of the first neural network and the second neural network, the discrimination network is trained first, and then the second neural network is trained. Next, the sample data is input into the first neural network and the second neural network again, and based on the output results of the first neural network and the second neural network, the discrimination network is trained first, and then the second neural network is trained; and so on. For example, the sample data input in different training stages can be different. After alternately training the discrimination network and the second neural network, the discrimination network and the second neural network game with and learn from each other in an adversarial way, thus producing a better output result.

For example, the first neural network can be a large neural network that has been trained. The second neural network can be a network which is established based on the structure of the convolutional neural network described above and of which the parameters need to be trained. For example, the first neural network is used to train the second neural network, and the parameters of the first neural network are more than the parameters of the second neural network. For example, the parameters of the neural network include the weight parameters of each convolution layer in the neural network. The greater the absolute value of the weight parameter is, the greater the contribution of the neuron corresponding to the weight parameter to the output of the neural network, and the more important it is to the neural network. Generally, the more the parameters of the neural network, the higher the complexity of the neural network, and the larger the "capacity" of the neural network, which means that the neural network can complete more complicated learning tasks. Compared with the first neural network, the second neural network is simplified. The second neural network has fewer parameters and a more simple network structure, so that the second neural network occupy less resources (such as computing resources, storage resources, etc.) when running, and therefore, it can be applied to a lightweight terminal. By adopting the above training method, the second neural network can learn the reasoning ability of the first neural network, so that the second neural network has a strong reasoning ability while having a simple structure.

Figure 5A:
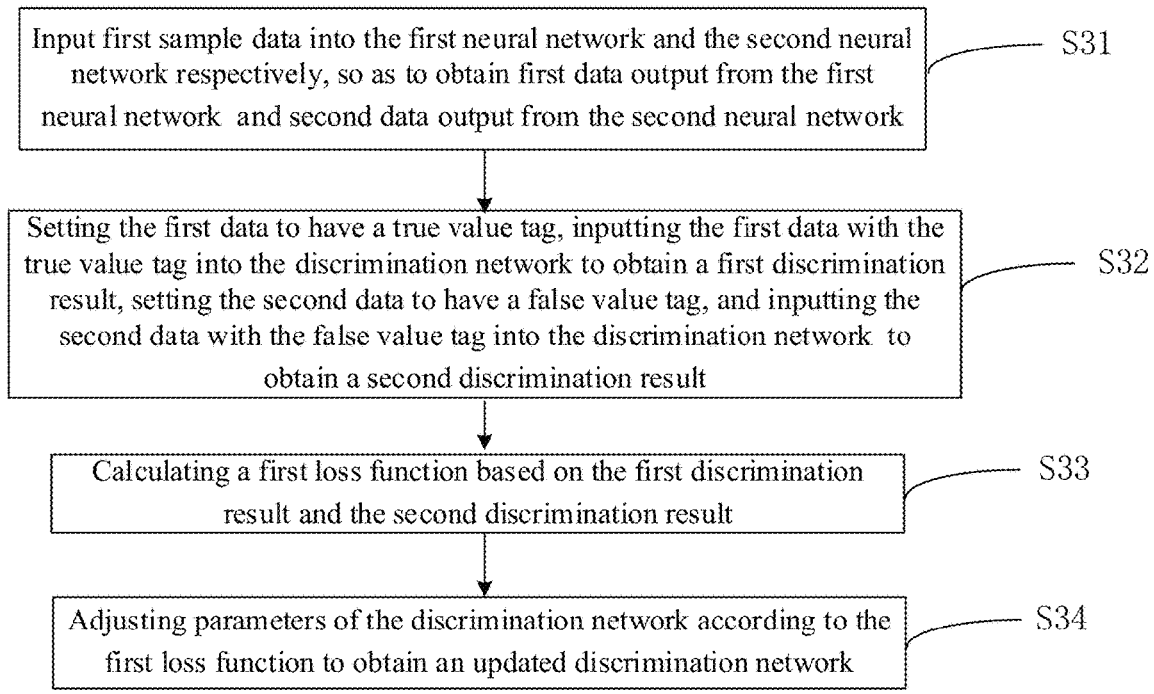
FIG. 5A is a schematic flowchart of training a discrimination network in an image processing method provided by some embodiments of the present disclosure.
Figure 5B:
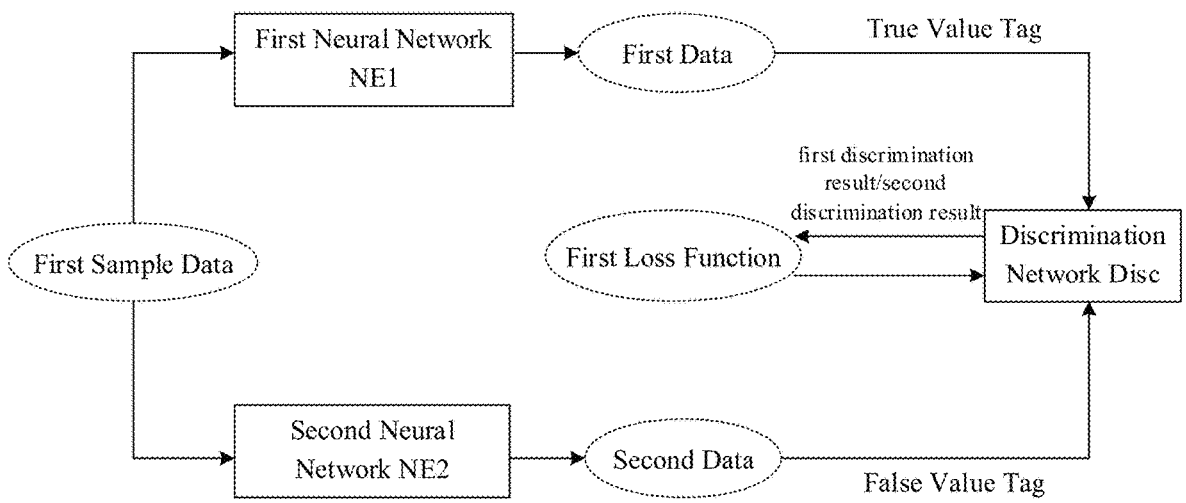
FIG. 5B is a schematic diagram of a scheme for training the discrimination network shown in FIG. 5A.

FIG. 5A is a schematic flowchart of training a discrimination network in an image processing method provided by some embodiments of the present disclosure, and FIG. 5B is a schematic diagram of a scheme for training the discrimination network shown in FIG. 5A. The training scheme of the discrimination network is illustratively described below with reference to FIG. 5A and FIG. 5B.

For example, in some examples, as shown in FIG. 5A and FIG. 5B, training the discrimination network includes the following operations.

Step S31: inputting first sample data into the first neural network NE1 and the second neural network NE2, respectively, so as to obtain first data output from the first neural network NE1 and second data output from the second neural network NE2;

Step S32: setting the first data to have a true value tag, inputting the first data with the true value tag into the discrimination network Disc to obtain a first discrimination result, setting the second data to have a false value tag, and inputting the second data with the false value tag into the discrimination network Disc to obtain a second discrimination result;

Step S33: calculating a first loss function based on the first discrimination result and the second discrimination result; and Step S34: adjusting parameters of the discrimination network Disc according to the first loss function to obtain an updated discrimination network Disc.

For example, in step S31, the first sample data can be image data based on a video, and both the first data and the second data are image data. Of course, the first sample data can also be image data obtained by other means, without being limited in the embodiments of the present disclosure. For example, in some examples, the first sample data is image data obtained based on a plurality of videos with the same bitrate. Therefore, the convolutional neural network trained by using the first sample data can have better processing ability and effect on the image data of a video with this bitrate, so that the convolutional neural network can be highly targeted to this bitrate. For example, in some examples, the original video can be compressed at different bitrates in terms of video quality, and Gaussian noise and quantum noise can be randomly added to form a low-quality video, the low-quality video can be subjected to video frame extraction so as to obtain the first sample data, and the first sample data is the video frame of the low-quality video.

For example, the first neural network NE1 can be a large trained neural network with the function of improving definition. For example, the first neural network NE1 includes a plurality of stages of down-sampling units and a plurality of stages of up-sampling units corresponding to the plurality of stages of down-sampling units, the output of each stage of down-sampling unit serves as the input of the next stage of down-sampling unit, and the input of each stage of up-sampling unit includes the output of a stage of down-sampling unit corresponding to this stage of up-sampling unit and the output of the previous stage of up-sampling unit. In the neural network, the plurality of down-sampling units are used to perform a plurality of feature extraction operations on images, the plurality of up-sampling units are used to perform a plurality of up-sampling operations on images, and the feature image output by each down-sampling unit is input into a corresponding up-sampling unit, so that the feature information in the image can be captured effectively and the definition of the image can be improved. For example, the first neural network NE1 can adopt the network structure shown in FIG. 7A, and the related description is present in the following, without being repeated here. It should be noted that the first neural network NE1 can adopt any trained neural network or any combination of neural networks, which can be determined according to actual needs, without being limited in the embodiments of the present disclosure. For example, the first neural network NE1 is used to improve the definition of sample data, so that the trained convolutional neural network also has the function of improving definition. For example, improving definition can be specifically implemented as denoising and/or deblurring, so as to achieve image enhancement.

For example, the second neural network NE2 is established based on the network structure of the convolutional neural network described above, that is, the second neural network NE2 has the same network structure as the convolutional neural network described above, but the parameters thereof need to be trained and adjusted.

For example, in step S32, the first data is set to have a true value tag, and the second data is set to have a false value tag. For example, in some examples, the true value tag can be expressed as [1], and the false value tag can be expressed as [0]. The first data with the true value lag is input to the discrimination network Disc to obtain a first discrimination result, and the second data with the false value tag is input into the discrimination network Disc to obtain a second discrimination result.

Figure 5C:
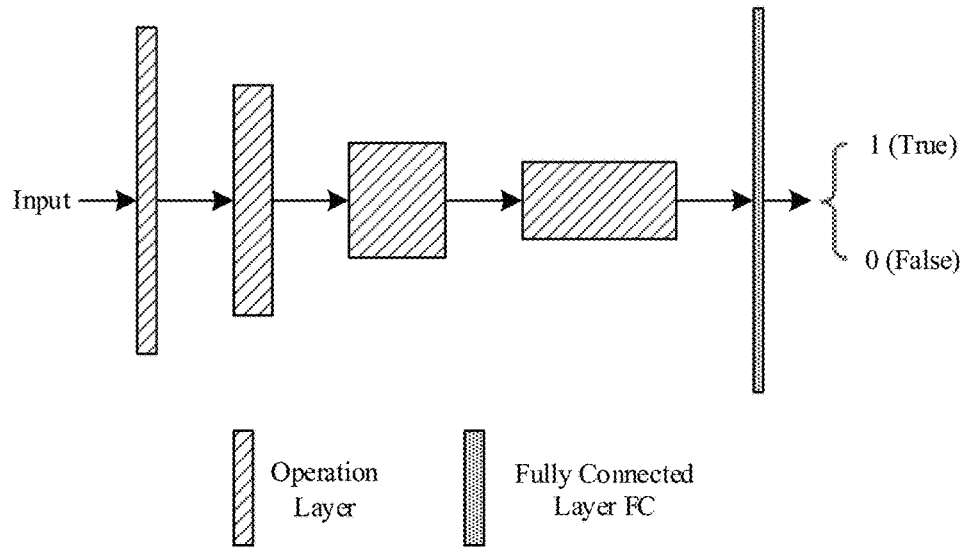
FIG. 5C is a discrimination network.

For example, the discrimination network Disc can adopt a convolution neural network model in a stack mode. FIG. 5C is a discrimination network, and the discrimination network is, for example, a convolutional neural network model in a stack mode. For example, as shown in FIG. 5C, the discrimination network Disc includes a plurality of operation layers, and each operation layer is formed of a convolution layer and an activation layer (adopting ReLU function), and finally the result is output via a fully connected layer FC. For example, in the present example, the sizes of convolution kernels of the convolution layers in the four operation layers are all 3×3, and the numbers of feature images output by the four operation layers are 32, 64, 128, and 192, respectively. The final result output by the discrimination network Disc is a probability value of two classifications, that is, the discrimination network Disc judges and outputs any value in the range of 0 to 1. The closer this value is to 1, the higher the probability of judging that the input is true, and otherwise, the higher the probability of judging that the input is false.

It should be noted that the embodiments of the present disclosure are not limited to this case, and the discrimination network Disc can also adopt any type of discrimination network. The related description can refer to conventional designs, and is not redundantly described here.

For example, as shown in FIG. 5A and FIG. 5B, in step S33, the first loss function is calculated based on the first discrimination result and the second discrimination result, and the first loss function is a loss function of the discrimination network Disc. For example, in some examples, the first loss function may adopt a cross entropy loss function, and the cross entropy loss function characterizes the difference between the real sample tag and the prediction probability. For example, the formula of the cross entropy loss function is:

$$\text{Loss} = -\frac{1}{N} \sum_{i=0}^{N} [y_i \log(p_i) + (1 - y_i)\log(1 - p_i)],$$

where N is the amount of data (i.e., the total amount of the first data and the second data), $y_i$ is the tag corresponding to each data (i.e., 0 or 1), and pi is the predicted value of the discrimination network for each data.

It should be noted that, in the embodiments of the present disclosure, the loss function of the discrimination network Disc can adopt any type of functions and is not limited to the cross entropy loss function, which can be determined according to actual needs, without being limited in the embodiments of the present disclosure.

For example, in step S34, the parameters of the discrimination network Disc are adjusted according to the first loss function to obtain an updated discrimination network Disc, and the updated discrimination network Disc has better discriminative capability.

Through the above steps S31-S34, the training for the discrimination network Disc can be completed for one time.

Figure 6A:
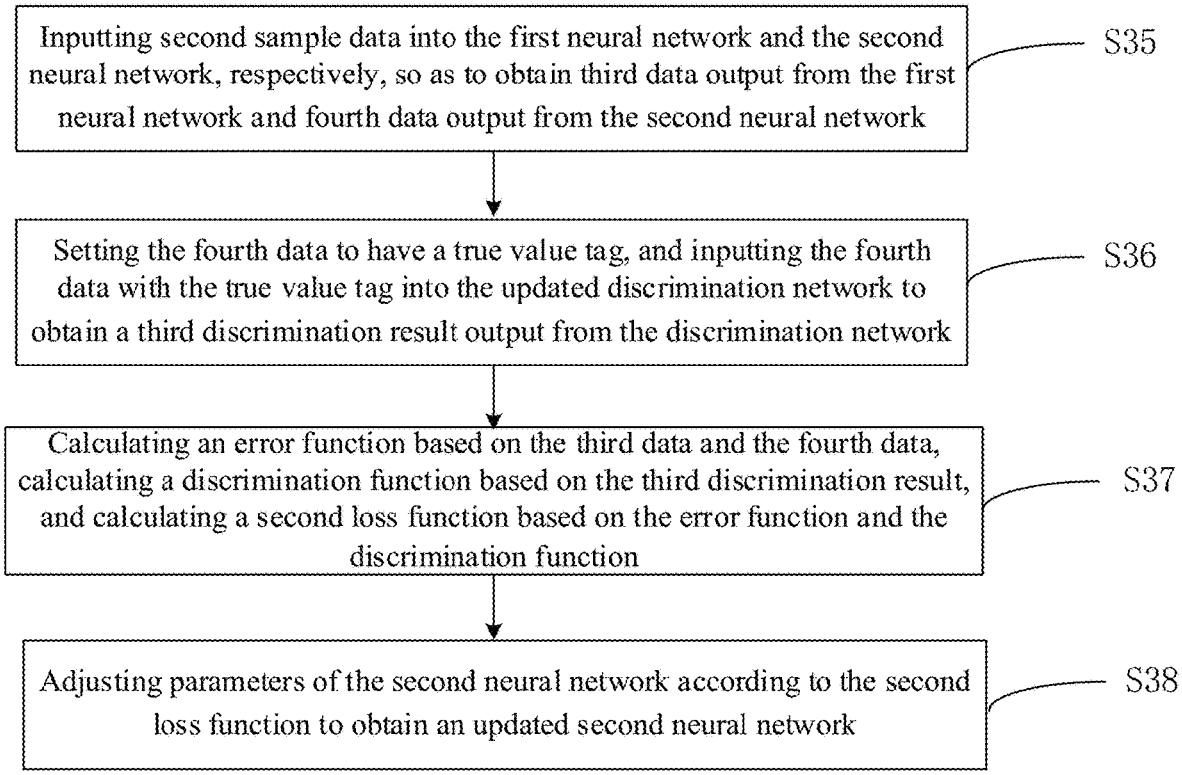
FIG. 6A is a schematic flowchart of training a second neural network in an image processing method provided by some embodiments of the present disclosure.
Figure 6B:
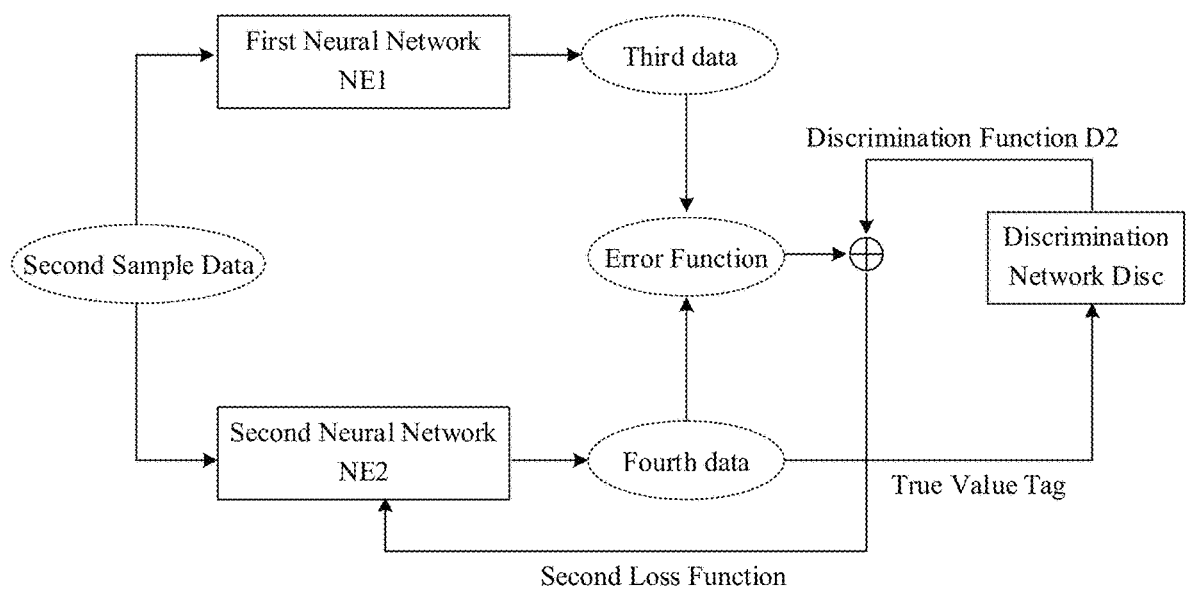
FIG. 6B is a schematic diagram of a scheme for training the second neural network shown in FIG. 6A.

FIG. 6A is a schematic flowchart of training a second neural network in an image processing method provided by some embodiments of the present disclosure, and FIG. 6B is a schematic diagram of a scheme for training the second neural network shown in FIG. 6A.

The training scheme of the second neural network is illustratively described below with reference to FIG. 6A and FIG. 6B.

For example, in some examples, as shown in FIG. 6A and FIG. 6B, training the second neural network includes the following operations.

Step S35: inputting second sample data into the first neural network NE1 and the second neural network NE2, respectively, so as to obtain third data output from the first neural network NE1 and fourth data output from the second neural network NE2;

Step S36: setting the fourth data to have a true value tag, and inputting the fourth data with the true value tag into the updated discrimination network Disc to obtain a third discrimination result output from the discrimination network Disc;

Step S37: calculating an error function based on the third data and the fourth data, calculating a discrimination function based on the third discrimination result, and calculating a second loss function based on the error function and the discrimination function; and Step S38: adjusting parameters of the second neural network NE2 according to the second loss function to obtain an updated second neural network NE2.

The above steps S35-S38 can be executed after the steps S31-S34 are executed.

For example, in step S35, the second sample data can be image data based on a video, and both the third data and the fourth data are image data. Of course, the second sample data can also be image data obtained by other means, without being limited in the embodiments of the present disclosure. For example, in some examples, the second sample data is image data based on a plurality of videos with the same bitrate. Therefore, the convolutional neural network trained by using the second sample data can have better processing ability and effect on the image data of a video with this bitrate, so that the convolutional neural network can be highly targeted to this bitrate. For example, in some examples, the original video can be compressed at different bitrates in terms of video quality, and Gaussian noise and quantum noise can be randomly added to form a low-quality video, the low-quality video can be subjected to video frame extraction so as to obtain the second sample data, and the second sample data is the video frame of the low-quality video. For example, the first sample data and the second sample data can be the same or different.

For example, in step S36, the fourth data is set to have a true value tag (e.g., expressed as [1]), and the fourth data with the true value tag is input to the discrimination network Disc to obtain a third discriminative result output from the discrimination network Disc. For example, the numerical range of the third discriminative result ranges from 0 to 1. It should be noted that the discrimination network Disc at this stage is the updated discrimination network after the training based on the above steps S31-S34.

For example, in step S37, the error function is calculated based on the third data and the fourth data. For example, in some examples, the error function can adopt an average absolute error (L1 loss) function. For example, the formula of the average absolute error function is as follows: L1 loss=mean(|X−Y|), where X is the fourth data and Y is the third data. It should be noted that the error function is not limited to the average absolute error (L1 loss) function, but can also be any other suitable error function, which can be determined according to actual needs, without being limited in the embodiments of the present disclosure. The discrimination function D2 is calculated based on the third discrimination result, and for example, the discrimination function D2 can be calculated by using any suitable method, without being limited in the embodiments of the present disclosure.

After calculating the error function (e.g., the average absolute error function) and the discriminant function D2, a second loss function is calculated based on the error function (e.g., the average absolute error function) and the discriminant function D2, and the second loss function is a loss function of the second neural network NE2. For example, the second loss function is the weighted sum of the error function (e.g., the average absolute error function) and the discriminant function D2, which can be expressed as: NE1 loss=W1*L1 loss+W2*D2, where NE1 loss represents the second loss function, W1 represents the weight of the error function, and W2 represents the weight of the discriminant function D2. For example, the weight W1 of the error function is in the range of 90 to 110 (e.g., 100), and the weight of the discrimination function D2 is in the range of 0.5 to 2 (e.g., 1).

For example, in step S38, the parameters of the second neural network NE2 are adjusted according to the second loss function to obtain an updated second neural network NE2.

Through the above steps S35-S38, the training for the second neural network NE2 can be completed for one time.

For example, through the above steps S31-S38, an adversarial training for the discrimination network Disc and the second neural network NE2 can be alternately completed for one time. It should be noted that each alternate training is performed based on the previous training and updating. That is, when training the second neural network NE2, the training is performed by using the updated discrimination network Disc based on the previous training; and when training the discrimination network Disc, the training is performed by using the updated second neural network NE2 based on the previous training. According to the requirements, the adversarial training for the discrimination network Disc and the second neural network NE2 can be alternately performed for one time or a plurality of times, and the image processing capability of the trained second neural network NE2 can meet the requirements through optimization and iteration. For example, in some examples, the second neural network NE2 that meets the requirements can be obtained by carrying out alternate training for about 20 million times in total. For example, the parameters of the trained second neural network NE2 (such as the weight parameters in the convolution layers) have been optimized and adjusted, and the trained second neural network NE2 is the convolutional neural network described above.

For example, in some examples, the first sample data and the second sample data used in one time of adversarial training for the discrimination network Disc and the second neural network NE2 can be the same, that is, the same sample data can be used to complete the training of the discrimination network Disc for one time and the training of the second neural network NE2 for one time. For example, in the case of performing a plurality of times of training, the first sample data and the second sample data used for the adversarial training of a same time can be the same. For example, after the adversarial training of one time is completed, in the subsequent second adversarial training for the discrimination network Disc and the second neural network NE2, the first sample data being used is different from the first sample data used in the previous adversarial training, and the second sample data being used is different from the second sample data used in the previous adversarial training. In this way, training efficiency can be improved, training manners can be simplified, and utilization rate of data can be improved.

In the image processing method provided by the embodiments of the present disclosure, by adopting the above training method, the convolutional neural network meeting the requirements can be obtained by quick training, the training effect is good, and the convolutional neural network obtained by training can have strong image processing capability and good image processing effect. In the case where the first neural network NE1 being used has the function of denoising and/or deblurring, the convolutional neural network obtained by training also has the function of denoising and/or deblurring, and the denoising and/or deblurring effect is very good.

It should be noted that in the embodiments of the present disclosure, the image processing method can further include more steps, and the execution order of the steps can be adjusted according to actual requirements, without being limited in the embodiments of the present disclosure.

For example, the first neural network NE1 can adopt any trained neural network, such as a large neural network with denoising function or a large neural network with deblurring function, or a combination of a large neural network with denoising function and a large neural network with deblurring function.

Figure 7A:
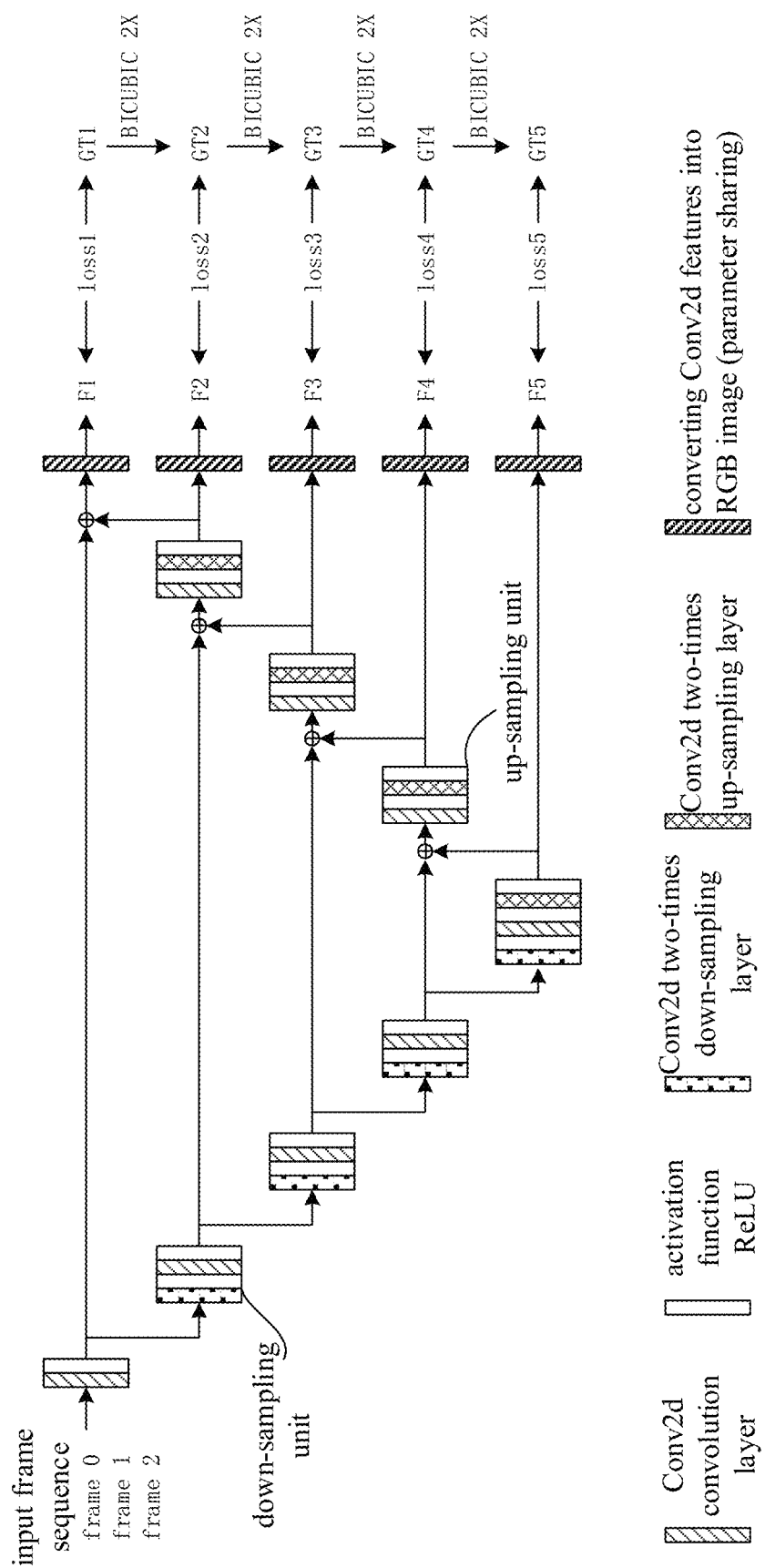
FIG. 7A is a neural network with denoising function.

FIG. 7A is a neural network with denoising function. As shown in FIG. 7A, the neural network includes a plurality of stages of down-sampling units and a plurality of stages of up-sampling units corresponding to the plurality of stages of down-sampling units, and the plurality of stages of down-sampling units are in one-to-one correspondence with the plurality of stages of up-sampling units. For example, in FIG. 7A, the units on the left side are down-sampling units, and the units on the right side are up-sampling units. The output of each stage of down-sampling unit serves as the input of the next stage of down-sampling unit, and the input of each stage of up-sampling unit includes the output of a stage of down-sampling unit corresponding to this stage of up-sampling unit and the output of the previous stage of up-sampling unit. That is, the output of the down-sampling unit is provided not only to the next stage of down-sampling unit adjacent thereto, but also to the up-sampling unit corresponding to this down-sampling unit.

For example, each down-sampling unit includes operational layers such as a Conv2d convolution layer, a ReLU activation function layer, a Conv2d two-times down-sampling layer, etc., and each up-sampling unit includes operational layers such as a Conv2d convolution layer, a ReLU activation function layer, a Conv2d two-times up-sampling layer, etc. Three consecutive frames of images are input to the neural network at the same time, and the output is the result of the intermediate frame of the input. Assuming that the size of the input frame sequence is (H, W, C), if the input is an RGB image, C=3; and if the input is a gray image, C=1. In the case where three frames of images are input at the same time and merged in C channel, the input size of the network model is (H, W, C*3).

The neural network has a U-shaped symmetrical structure, and the left side is mainly provided with the down-sampling units and the right side is mainly provided with the up-sampling units. In this neural network, the plurality of down-sampling units and the plurality of up-sampling units correspond to each other, and the feature image output by each down-sampling unit on the left side are input to the corresponding up-sampling unit on the right side, so that the feature image obtained at each layer level can be effectively used in subsequent calculations.

In this neural network, the batch size of the network is set to be batchsize=1 (B=1), and the feature layer number of each layer in the network is F. The Conv2d convolution layer selects a convolution kernel of (3, 3), and the stride is Stride=1, that is, the size of the feature image is not changed, and the size of the output is (B, H, W, F). The Conv2d two-times down-sampling layer selects a convolution kernel of (3, 3), and in this case, the stride is stride=2, that is, the down-sampling multiple is 2, and the size of the output is (B, H//2,W//2, F). The Conv2d two-times up-sampling layer selects a convolution kernel of (4, 4), and the stride is stride=2, that is, the up-sampling multiple is 2, and the size of the output is (B, H, W, F). A convolution kernel of (3, 3) is selected for converting Conv2d features into an RGB image (parameter sharing), the stride is stride=1, and the main purpose is to change the feature layer number from F to 3 so as to obtain the RGB image being output.

It should be noted that the parameters of the convolution kernel are shared, that is, the parameters of all Conv2d convolution kernels in the figure are the same, and in the training process, five images with different scales, i.e., F1, F2, F3, F4 and F5, are respectively output. For example, the sizes of these five images with different scales are F1 (H, W, 3), F2 (H//2, W//2, 3), F3 (H//4, W//4, 3), F4 (H//8, W//8, 3) and F5 (H//16, W//16, 3), respectively.

In the training process of the neural network, F1, F2, F3, F4, F5 are output at different scales and are used to calculate the loss function with true value images. For example, GT1 is a true value image. In order to obtain the true value images at other scales, BICUBIC down-sampling is performed on GT1 to obtain GT2 (H//2, W//2, 3), GT3 (H//4, W//4, 3), GT4 (H//8, W//8, 3), and GT5 (H//16, W//16, 3), respectively. When the neural network is used after training, the parameter-sharing Conv2d convolution layer is used only when finally outputting F1, while F2, F3, F4 and F5 are no longer output, that is, the convolution layer is not used at F2, F3, F4 and F5.

Figure 7B:
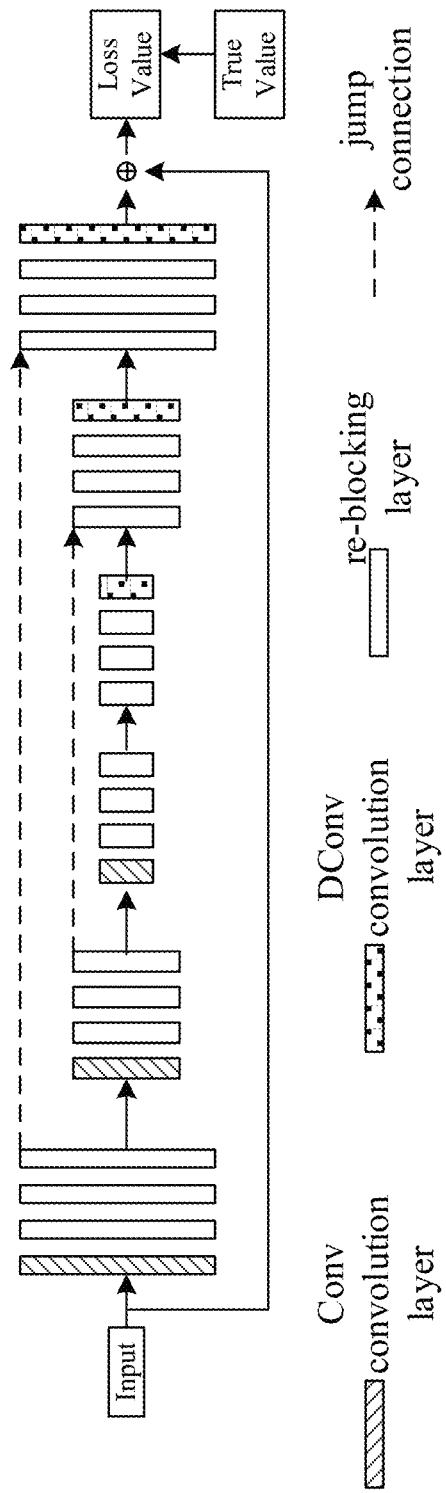
FIG. 7B is a neural network with deblurring function.

FIG. 7B is a neural network with deblurring function. As shown in FIG. 7B, the neural network includes a plurality of functional layer groups with different convolution kernel numbers, and each functional layer group includes one or more Cony convolution layers, DConv convolution layers, re-blocking layers, etc. In addition, in this network, jump connections are established between different functional layer groups. By setting jump connections, the gradient vanishing problem in the case of deep network layers can be solved, and at the same time, the back propagation of gradient can be facilitated, and the training process can be accelerated.

For the description of this neural network, reference can be made to the neural network using jump connection and re-blocking layer in conventional designs, which will not be redundantly described here.

It should be noted that, in the embodiments of the present disclosure, the trained convolutional neural network can process the input image to improve the definition of the image, but it is not limited to only having denoising and/or deblurring functions, and the convolutional neural network can also have other arbitrary functions, as long as the first neural network NE1 with corresponding functions is adopted and the second neural network NE2 is trained by using the first neural network NE1.

Figure 8A:
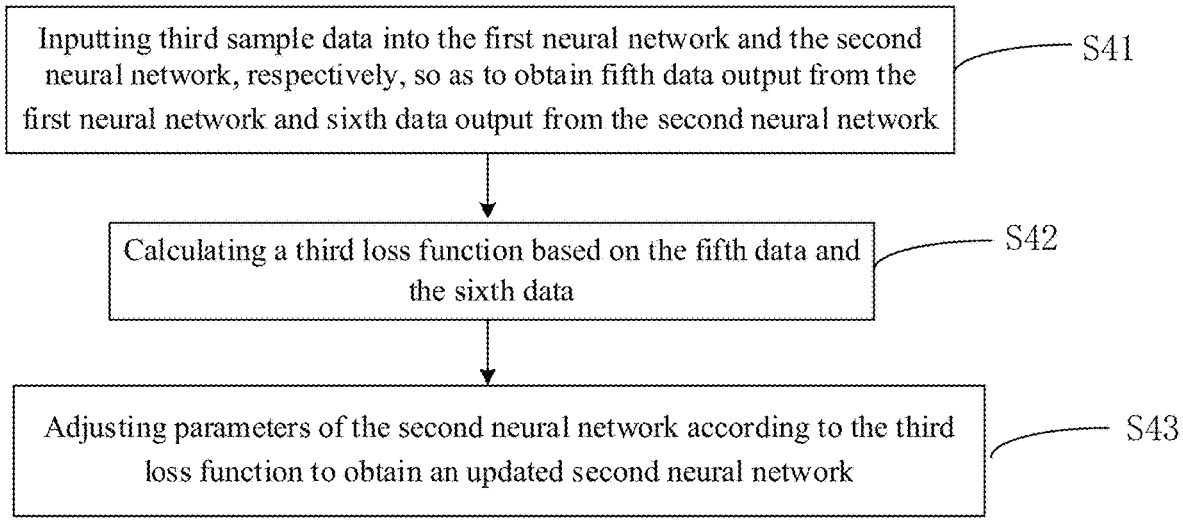
FIG. 8A is a schematic flowchart of training a second neural network in another image processing method provided by some embodiments of the present disclosure.
Figure 8B:
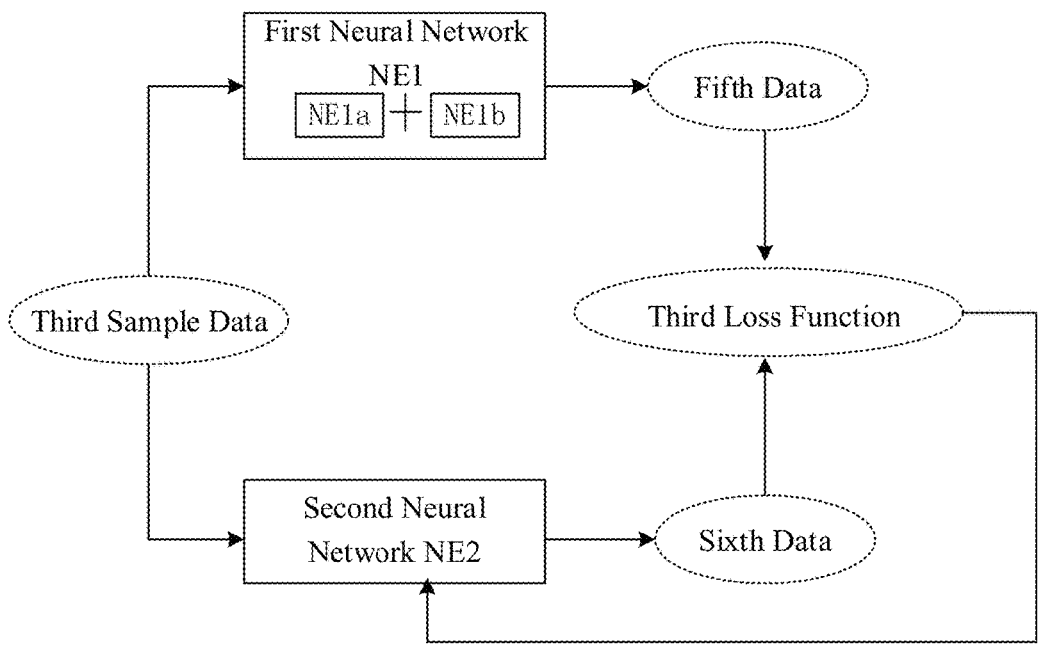
FIG. 8B is a schematic diagram of a scheme for training the second neural network shown in FIG. 8A.

FIG. 8A is a schematic flowchart of training a second neural network in another image processing method provided by some embodiments of the present disclosure, and FIG. 8B is a schematic diagram of a scheme for training the second neural network shown in FIG. 8A. For example, in the present example, the training method shown in FIG. 8A and FIG. 8B can be adopted to train the convolutional neural network. Different from the training method shown in FIGS. 5A-6B, in the present example, the discrimination network is not used any longer, and only the first neural network NE1 is used to train the second neural network NE2, so as to obtain the required convolutional neural network.

The training scheme of the second neural network is illustratively described below with reference to FIG. 8A and FIG. 8B.

For example, in some examples, as shown in FIG. 8A and FIG. 8B, training the second neural network includes the following operations.

Step S41: inputting third sample data into the first neural network NE1 and the second neural network NE2, respectively, so as to obtain fifth data output from the first neural network NE1 and sixth data output from the second neural network NE2;

Step S42: calculating a third loss function based on the fifth data and the sixth data; and Step S43: adjusting parameters of the second neural network NE2 according to the third loss function to obtain an updated second neural network NE2.

For example, firstly, a video data set with high definition is selected, then blurred and noised to an extent, and then compressed to a bitrate of 1M, so as to lower the video quality and make the processed videos meet the standard of a standard definition video in the actual video website. Video frames are extracted from the processed video data set, and the obtained video frames form sample data. For example, the video data set with high definition can adopt the AIM data set, the AIM data set contains 240 videos of 1280*720, and each video has 100 frames.

For example, in the present example, the first neural network NE1 includes two large neural networks NE1$a$ and NE1$b$ arranged in sequence. NE1$a$ and NE1$b$ are, for example, the neural network shown in FIG. 7A and the neural network shown in FIG. 7B, respectively, and the arrangement order of these two neural networks is not limited.

For example, in step S41, the third sample data is input to the first neural network NE1, one neural network NE1$a$ in the first neural network NE1 processes the third sample data and then inputs the processing result to another neural network NE1$b$ in the first neural network NE1, and the another neural network NE1$b$ processes the received image and outputs the processing result as the output of the first neural network NE1. Therefore, the fifth data output by the first neural network NE1 is subjected to both denoising and deblurring, and the first neural network NE1 has both denoising and deblurring functions. The fifth data is taken as a true value image. The third sample data is input into the second neural network NE2, and the sixth data output by the second neural network NE2 is taken as a false value image.

For example, in steps S42 and S43, the third loss function is calculated based on the fifth data and the sixth data, and back propagation is performed by using the third loss function to adjust the parameters of the second neural network NE2, thereby obtaining an updated second neural network NE2, that is, obtaining the required convolutional neural network.

For example, in the present example, the third loss function can adopt a weighted sum of the average absolute error (L1 loss) function and the Sobel loss function. The formula of the average absolute error function is as follows: L1 loss=mean(|X−Y|), where X is the sixth data and Y is the fifth data. The formula of the Sobel loss function is: Sobel loss=mean (|sobel_edge(gray(X))−sobel_edge(gray(Y))|), where X is the sixth data, Y is the fifth data, and Sobel_edge( )represents Sobel edge. This formula shifts X and Y into gray scale domain, then extracts Sobel edge, then calculates difference and then calculates the mean value. For example, in some examples, the weight of the L1 loss function can be set to be in the range of 0.5 to1.5 (e.g., 1), and the weight of the Sobel loss function can be set to be in the range of 1.5 to 2.5 (e.g., 2), so that a good training effect can be achieved.

For example, Sobel loss (also known as Sobel operator) is one of the most important operators in edge detection of pixel image. The operator contains two matrices of 3*3, which are distinguished as horizontal and vertical, respectively. And when convolving them with the image, the horizontal brightness difference approximation value and the vertical brightness difference approximation value can be obtained, respectively. For example, Gx and Gy are used to represent the approximation value of gray partial derivative in horizontal and vertical directions, respectively, and the formula of Sobel operator is as follows:

$$G_x = \begin{pmatrix} -1 & 0 & +1 \\ -2 & 0 & +2 \\ -1 & 0 & +1 \end{pmatrix} * A, G_y = \begin{pmatrix} +1 & +2 & +1 \\ 0 & 0 & 0 \\ -1 & -2 & -1 \end{pmatrix} * A.$$

In the Sobel operator above, A represents an image. For each pixel, the gradients in X and Y directions can be obtained. The estimated value of the gradient can be calculated by the following formula: $G=\sqrt{G_x^2+G_y^2}$. For example, a threshold value Gmax can be defined. If G is smaller than Gmax, the point can be considered as a boundary value, and the point is retained and set to be white; otherwise, the point is set to be black. Therefore, the gradient information of the image is obtained. In the training process, the fifth data and the sixth data are shifted into the gray scale domain, and Sobel gradients are calculated, respectively, and the average difference of the gradient images is calculated as the loss value for back propagation.

In the present example, because the first neural network NE1 has both denoising and deblurring functions, the trained convolutional neural network can learn denoising and deblurring functions at the same time, and can recover the definition of video frames well while maintaining image information. By adopting the above training method, the convolutional neural network meeting the requirements can be quickly obtained by training with less sample data.

At least one embodiment of the present disclosure further provides a terminal device, which can process an input video based on a convolutional neural network to improve the picture definition, realize real-time image quality enhancement, and has good processing effect and high processing efficiency.

Figure 9A:
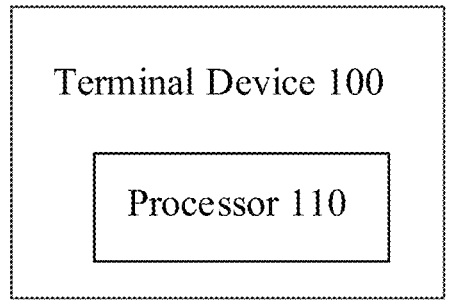
FIG. 9A is a schematic block diagram of a terminal device provided by some embodiments of the present disclosure.

FIG. 9A is a schematic block diagram of a terminal device provided by some embodiments of the present disclosure. For example, as shown in FIG. 9A, a terminal device 100 includes a processor 110.

For example, the processor 110 is configured to: obtain an input video bitrate and an input video, in which the input video includes a plurality of input image frames; and select, according to the input video bitrate, a video processing method corresponding to the input video bitrate to process at least one input image frame among the plurality of input image frames so as to obtain at least one output image frame. For example, the definition of the at least one output image frame is higher than the definition of the at least one input image frame, and different input video bitrates correspond to different video processing methods.

For example, the video processing method includes: processing at least one input image frame based on a trained neural network to obtain at least one output image frame. For example, the convolutional neural network shown in FIG. 3A can be used to process the input image frame, and the neural network has the functions of denoising and/or deblurring, can effectively improve the definition of the image, has a good detail restoring effect, and can realize image enhancement. For example, the image processing method provided by any embodiment of the present disclosure can be adopted to realize the processing of the input image frame.

For example, processing the at least one input image frame based on the trained neural network to obtain the at least one output image frame can include the following operations:

performing feature extraction on the at least one input image frame to obtain a plurality of first output images;
concatenating the at least one input image frame and the plurality of first output images to obtain a first output image group, in which the first output image group includes the at least one input image frame and the plurality of first output images;
performing the feature extraction on the first output image group to obtain a plurality of second output images;
fusing the plurality of second output images and the plurality of first output images to obtain a plurality of third output images;
concatenating the at least one input image frame and the plurality of third output images to obtain a second output image group, in which the second output image group includes the at least one input image frame and the plurality of third output images; and
performing the feature extraction on the second output image group to obtain the at least one output image frame.

For example, the above-mentioned steps for processing the input image frame are basically the same as the steps shown in FIG. 3B, and the related description can refer to the aforementioned contents, and is not repeated here.

For example, the trained neural networks corresponding to different video processing methods are different. That is, different input video bitrates correspond to different video processing methods, and different video processing methods correspond to different neural networks, and input videos with different input video bitrates are processed by using different neural networks. The neural network is bitrate-specific, and by distinguishing the bitrates, the neural network can have better processing effect for videos with corresponding bitrate. Furthermore, input videos with different bitrates are processed by using different video processing methods (or different neural networks), so that the output videos obtained after processing the input videos with different bitrates have relatively consistent definition. Therefore, the processing effect is not affected by the bitrate, thus improving the stability and consistency of the performance of the terminal device 100.

For example, the trained neural networks corresponding to different video processing methods are trained by using different sample data sets, the different sample data sets are obtained based on different video sets, each video set includes a plurality of videos, videos in a same video set have a same bitrate, and videos in different video sets have different bitrates. That is to say, for a same neural network, the sample data set used in its training comes from videos with a same bitrate; and for different neural networks, the training sample data sets come from videos with different bitrates. The video bitrate refers to the number of data bits transmitted per unit time during data transmission, and the unit thereof is usually kbps, that is, kilobits per second. The higher the bitrate, the smaller the compression ratio of the video, the smaller the picture quality loss, the smaller the noise of the image, and the closer it is to the original video. The lower the bitrate, the greater the noise of the image. Accordingly, the denoising intensity of the neural network corresponding to a low bitrate is large, while, the denoising intensity of the neural network corresponding to a high bitrate is small. It should be noted that "high" and "low" in the above description are relative, that is, high and low bitrates are relative.

Figure 9B:
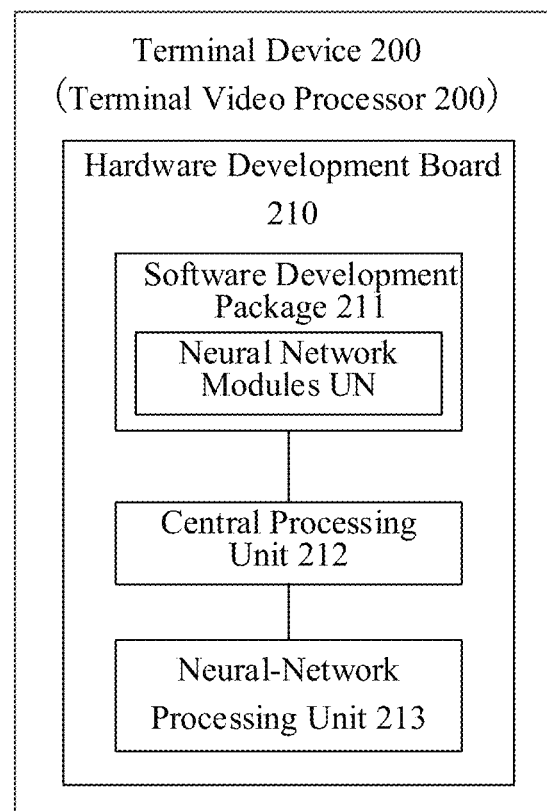
FIG. 9B is a schematic block diagram of another terminal device provided by some embodiments of the present disclosure.

FIG. 9B is a schematic block diagram of another terminal device provided by some embodiments of the present disclosure. For example, as shown in FIG. 9B, a terminal device 200 is implemented as, for example, a terminal video processor 200, and includes a hardware development board 210. A software development package 211 is deployed on the hardware development board 210, and the hardware development board 210 includes a central processing unit 212 and a neural-network processing unit 213.

For example, the software development package 211 can be implemented as a collection of programs with a general interface or a custom interface and related files, that is, a software development kit (SDK). For example, the software development package 211 can be deployed in an on-chip memory (ROM) of the hardware development board 210, and can be read from the ROM at runtime.

For example, the software development package 211 includes a plurality of neural network modules UN, the plurality of neural network modules UN are obtained based on a plurality of convolutional neural networks, respectively, and the plurality of neural network modules UN are in one-to-one correspondence with the plurality of convolutional neural networks. For example, the convolutional neural network can be the convolutional neural network shown in FIG. 3A, which has the functions of denoising and/or deblurring, can effectively improve the image clarity, has a good detail restoring effect, and can realize image enhancement.

For example, the plurality of neural network modules UN are obtained based on performing parameter quantization on the plurality of convolutional neural networks. For example, the data type can be converted from a 32-bit floating point number (float32) into an 8-bit integer number (int8), so as to realize parameter quantization, thereby effectively saving computing power and enabling the terminal video processor 200 to support the operation of the neural network module UN. For example, the convolutional neural network can be obtained by training with the precision of float32 (for example, the training method shown in FIGS. 5A-6B is adopted for training), and then the trained convolutional neural network is subjected to parameter quantization, so as to convert the data type into int8, thus obtaining the neural network module UN. The neural network module UN has the same function as the convolutional neural network. Although the processing effect of the neural network module UN is slightly different from the processing effect of the convolutional neural network due to parameter quantization, it is difficult to be perceived by human eyes, and the quality loss can be negligible.

Through parameter quantization, the computation amount and data amount can be effectively reduced, so that the neural network module UN is suitable for running on the terminal video processor 200, thus saving computing power and the amount of memory. For example, in the embodiments of the present disclosure, in the case where the data amount of the parameters are compressed by about 300 times, the output of the neural network module UN can still keep the image quality well, so the neural network module UN can be deployed onto the terminal video processor 200 and provides the possibility for real-time image enhancement.

For example, different neural network modules UN are used to process video data with different bitrates. For example, a plurality of convolutional neural networks shown in FIG. 3A can be trained in advance, and these convolutional neural networks have the same structure but different parameters. For example, different convolutional neural networks are trained by using different sample data sets, the different sample data sets are obtained based on different video sets, each video set includes a plurality of videos, and videos in a same video set have the same bitrate, while videos in different video sets have different bitrates. That is to say, for a same convolutional neural network, the sample data set used in its training comes from videos with a same bitrate; and for different convolutional neural networks, the training sample data sets come from videos with different bitrates. The video bitrate refers to the number of data bits transmitted per unit time during data transmission, and the unit thereof is usually kbps, that is, kilobits per second. The higher the bitrate, the smaller the compression ratio of the video, the smaller the picture quality loss, the smaller the noise of the image, and the closer it is to the original video. The lower the bitrate, the greater the noise of the image. Accordingly, the denoising intensity of the neural network corresponding to a low bitrate is large, while, the denoising intensity of the neural network corresponding to a high bitrate is small. It should be noted that "high" and "low" in the above description are relative, that is, high and low bitrates are relative.

By distinguishing the bitrates, the trained convolutional neural networks are bitrate-specific and have better processing effect for videos with corresponding bitrates. For example, several convolutional neural networks can be trained for several common video bitrates. These convolutional neural networks are subjected to parameter quantization, and the obtained neural network modules UN are also bitrate-specific. Different neural network modules UN are used to process video data with different bitrates, so as to achieve better processing effect.

For example, the central processing unit 212 is configured to: invoke the software development package 211 and select one of the neural network modules UN according to the bitrate of the input video, and control the neural-network processing unit 213 to process the input video based on the selected neural network module UN, so as to improve the definition of the input video.

For example, the plurality of neural network modules UN are used to process video data with different bitrates, and each neural network module UN is used to process video data with a corresponding bitrate. According to the bitrate of the input video, a corresponding neural network module UN is selected, and the neural network module UN is used to process the input video, so that the definition of the input video can be improved and the real-time picture quality enhancement can be realized.

For example, the hardware development board 210 can be an ARM development board, and correspondingly, the central processing unit 212 can be a central processing unit (CPU) of ARM architecture. For example, the neural-network processing unit 213 can be a neural-network processing unit (NPU) suitable for the ARM development board, which adopts a data-driven parallel computing architecture and is suitable for processing massive multimedia data such as video and image. It should be noted that in the embodiments of the present disclosure, the types and hardware structures of the hardware development board 210, the central processing unit 212 and the neural-network processing unit 213 are not limited, and any applicable hardware can be adopted, which can be determined according to actual requirements, as long as the corresponding functions can be realized. For example, the hardware development board 210 can adopt Android system or Linux system for hardware integration, and can also adopt the operating system in smart TV or TV set-top box for integration, which is not limited in the embodiments of the present disclosure.

For example, the terminal video processor 200 can be implemented as a component in a TV terminal (e.g., smart TV), a TV set-top box, a component in a video playing device or any other form, without being limited in the embodiments of the present disclosure.

It should be noted that, in the embodiments of the present disclosure, the terminal device 200 can further include more components, structures and modules, without being limited as the cases shown in FIG. 9A and FIG. 9B, so as to achieve more comprehensive functions, which is not limited in the embodiments of the present disclosure. For example, in some examples, a selection module can be deployed in the terminal device 200, and the selection module is configured to select a corresponding neural network module UN according to the bitrate of the input video, so as to use the selected neural network module UN to process the input video. For example, in some other examples, a video decoding module and a video encoding module can also be deployed in the terminal device 200, the video decoding module is used for decoding operation and the video encoding module is used for encoding operation.

For example, at least one neural network module UN among the plurality of neural network modules UN is configured for processing as follows: receiving an input image; and processing the input image to obtain an output image. For example, the definition of the output image is higher than the definition of the input image. For example, processing the input image to obtain the output image includes: performing feature extraction on the input image to obtain a plurality of first images; concatenating the input image and the plurality of first images to obtain a first image group, the first image group including the input image and the plurality of first images; performing the feature extraction on the first image group to obtain a plurality of second images; fusing the plurality of second images and the plurality of first images to obtain a plurality of third images; concatenating the input image and the plurality of third images to obtain a second image group, the second image group including the input image and the plurality of third images; and performing the feature extraction on the second image group to obtain the output image. For example, the neural network module UN is used to implement the image processing method provided by the embodiments of the present disclosure, and the related description can refer to the foregoing contents, which is not repeated here.

Figure 10A:
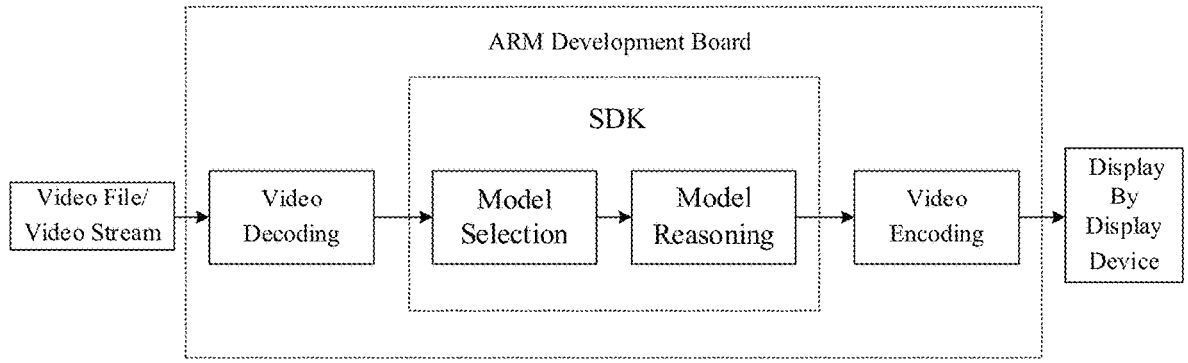
FIG. 10A is a data flow chart of a terminal device provided by some embodiments of the present disclosure.
Figure 10B:
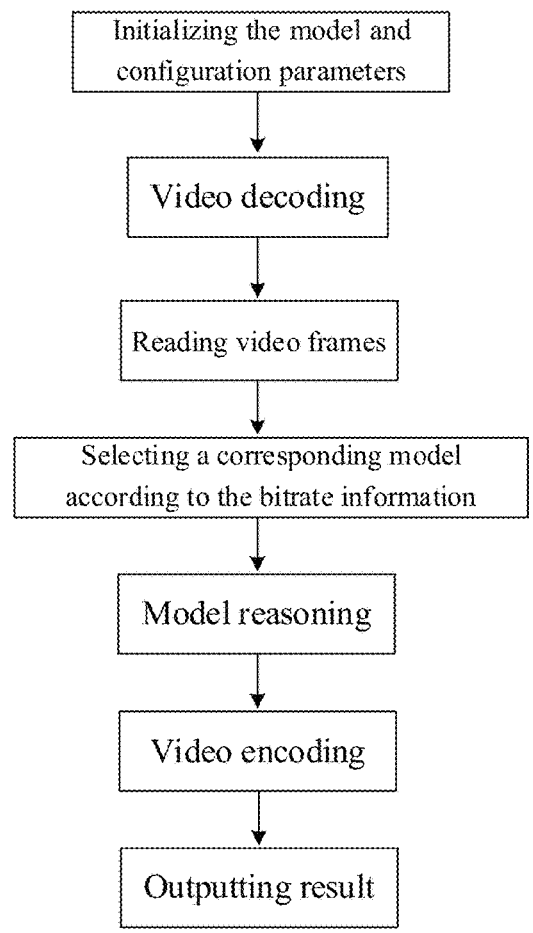
FIG. 10B is an operation flow chart of a terminal device provided by some embodiments of the present disclosure.

FIG. 10A is a data flow chart of a terminal device provided by some embodiments of the present disclosure, and FIG. 10B is an operation flow chart of a terminal device provided by some embodiments of the present disclosure. For example, in some examples, as shown in FIG. 10A and FIG. 10B, after the software development package 211 is started, a plurality of neural network modules UN can be imported first, and then video frames and video bitrate information can be read; because the mode of binding model and video bitrate is adopted, after the video bitrate is determined, the neural network module UN corresponding to the bitrate is selected for processing, and finally the result is output.

Specifically, the input video can be processed in the following manner.

Firstly, the model and configuration parameters are initialized. After initialization, the input video (such as a video file or a video stream) is decoded to obtain video frames. For example, in the case where the input video is a video file, the terminal device (such as the terminal video processor 200) can realize the picture quality enhancement of offline video, and in the case where the input video is a video stream, the terminal video processor 200 can realize the real-time picture quality enhancement of live video.

Then, the video frames are read, and processing is performed on the video frames. According to the bitrate information of the input video, a neural network module UN corresponding to the bitrate is selected, and then the selected neural network module UN is used for model reasoning, that is, for image processing (such as denoising and/or deblurring), so as to obtain the processed video frames. The definition of the processed video frame is improved. Then, the processed video frames are encoded and then output to a display device, and the display device displays the processed video.

Figure 11A:
FIG. 11A is a schematic diagram of a video picture.
Figure 11B:
FIG. 11B is an effect diagram after the picture shown in FIG. 11A is processed by a terminal device provided by the embodiments of the present disclosure.

FIG. 11A is a schematic diagram of a video picture, which is a video frame extracted from a video with the bitrate of 1M and a standard definition of 360p. FIG. 11B is an effect diagram after the picture shown in FIG. 11A is processed by a terminal device provided by the embodiments of the present disclosure. Comparing FIG. 11B with FIG. 11A, it can be seen that after the processing of the terminal device (e.g., the terminal video processor 200), the picture definition is improved and the image quality is enhanced. The terminal video processor 200 has good image quality enhancement capability and can realize real-time processing.

By using the neural network module UN, the terminal device (e.g., the terminal video processor 200) provided by the embodiments of the present disclosure can remove the noise of low-quality images and videos, improve the image definition, and realize image quality enhancement. In addition, because the neural network module UN deployed on the terminal video processor 200 has a simple structure, it can save the computing power of the device, improve the processing efficiency, be supported by the hardware capability of the terminal device, meet the demand for the processing speed of the video stream, and realize real-time image quality enhancement.

At least one embodiment of the present disclosure further provides an image processing apparatus. The convolutional neural network adopted by the image processing apparatus has a simple structure, which can save the computing power of the device, remove the noise of low-quality images and videos, improve the image definition, realize real-time image quality enhancement, and facilitate application to a terminal device. The image processing apparatus provided by at least one embodiment also has a good neural network training effect.

Figure 12:
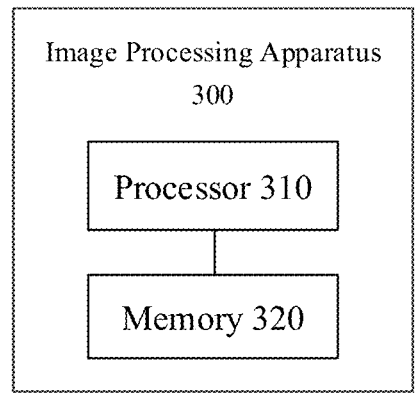
FIG. 12 is a schematic block diagram of an image processing apparatus provided by some embodiments of the present disclosure.

FIG. 12 is a schematic block diagram of an image processing apparatus provided by some embodiments of the present disclosure. As shown in FIG. 12, an image processing apparatus 300 includes a processor 310 and a memory 320. The memory 320 is configured to store non-transitory computer readable instructions (e.g., one or a plurality of computer program modules). The processor 310 is configured to execute the non-transitory computer readable instructions, and upon the non-transitory computer readable instructions being executed by the processor 310, one or more steps of the image processing method described above can be executed. The memory 320 and the processor 310 can be interconnected by a bus system and/or any other form of connection mechanism (not shown in the figure).

For example, the processor 310 can be a central processing unit (CPU), a digital signal processor (DSP), or any other processing unit having data processing capability and/or program execution capability, such as a field programmable gate array (FPGA). For example, the central processing unit (CPU) can be of X86 or ARM architecture. The processor 310 can be a general-purpose processor or a dedicated processor, and can control other components in the image processing apparatus 300 to perform desired functions.

For example, the memory 320 can include any combination of one or a plurality of computer program products, the computer program products can include computer readable storage medium of various forms, such as a volatile memory and/or a nonvolatile memory. The volatile memory can include, for example, a random access memory (RAM) and/or a cache, etc. The nonvolatile memory can include, for example, a read-only memory (ROM), a hard disk, an erasable programmable read-only memory (EPROM), a portable compact disk read-only memory (CD-ROM), a USB memory, a flash memory, etc. One or a plurality of computer program modules can be stored on the computer readable storage medium, and the processor 310 can run the one or the plurality of computer program modules to realize various functions of the image processing apparatus 300. The computer readable storage medium can also store various applications and various data, as well as various data used and/or generated by the applications.

It should be noted that, in the embodiments of the present disclosure, the specific functions and technical effects of the image processing apparatus 300 can be referred to the description of the image processing method described above, and are not redundantly described here.

Figure 13:
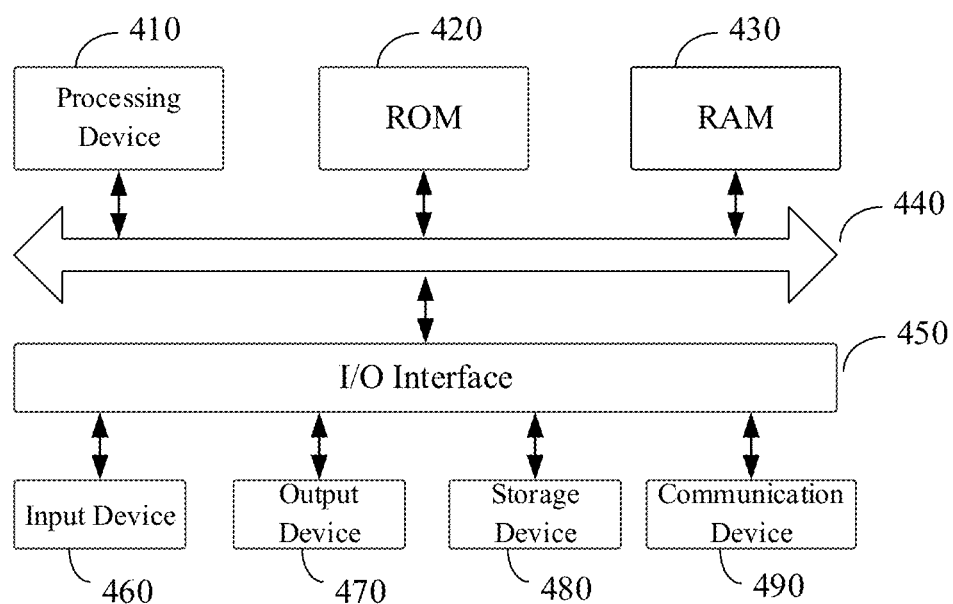
FIG. 13 is a schematic block diagram of another image processing apparatus provided by some embodiments of the present disclosure.

FIG. 13 is a schematic block diagram of another image processing apparatus provided by some embodiments of the present disclosure. An image processing apparatus 400 is, for example, applicable for implementing the image processing method provided by the embodiments of the present disclosure. The image processing apparatus 400 can be a user terminal or the like. It should be noted that the image processing apparatus 400 shown in FIG. 13 is only an example, and it will not bring any restrictions on the functions and application scope of the embodiments of the present disclosure.

As shown in FIG. 13, the image processing apparatus 400 can include a processing device (e.g., a central processing unit, a graphics processing unit, etc.) 410, which can perform various appropriate actions and processes according to a program stored in a read-only memory (ROM) 420 or a program loaded from a storage device 480 into a random access memory (RAM) 430. In the RAM 430, various programs and data necessary for the operations of the image processing apparatus 400 are also stored. The processing device 410, the ROM 420, and the RAM 430 are connected to each other through a bus 440. An input/output (I/O) interface 450 is also connected to the bus 440.

Generally, the following devices can be connected to the I/O interface 450: an input device 460 including, for example, a touch screen, a touch pad, a keyboard, a mouse, a camera, a microphone, an accelerometer, a gyroscope, etc.; an output device 470 including, for example, a liquid crystal display (LCD), a speaker, a vibrator, etc.; a storage device 480 such as a magnetic tape, a hard disk, etc.; and a communication device 490. The communication device 490 can allow the image processing apparatus 400 to perform wireless or wired communication with other electronic devices, so as to exchange data. Although FIG. 13 shows an image processing apparatus 400 having various devices, it should be understood that it is not required to implement or have all the illustrated devices, and the image processing apparatus 400 can alternatively implement or have more or fewer devices.

For example, the image processing method provided by the embodiments of the present disclosure can be implemented as a computer software program. For example, the embodiment of the present disclosure includes a computer program product, which includes a computer program carried on a non-transitory computer readable medium. The computer program includes program codes for executing the image processing method described above. In such an embodiment, the computer program can be downloaded and installed from the network via the communication device 490, or installed from the storage device 480, or installed from the ROM 420. When the computer program is executed by the processing device 410, the image processing method provided by the embodiments of the present disclosure can be executed.

At least one embodiment of the present disclosure further provides a storage medium for storing non-transitory computer readable instructions. Upon the non-transitory computer readable instructions being executed by a computer, the image processing method described in any embodiment of the present disclosure can be realized. By using the storage medium, the image can be processed by a convolutional neural network, and the convolutional neural network has a simple structure, which can save the computing power of device, remove the noise of low-quality images and videos, improve the image definition, realize real-time image quality enhancement, and facilitate application to a terminal device. The storage medium provided by at least one embodiment also has a good neural network training effect.

Figure 14:
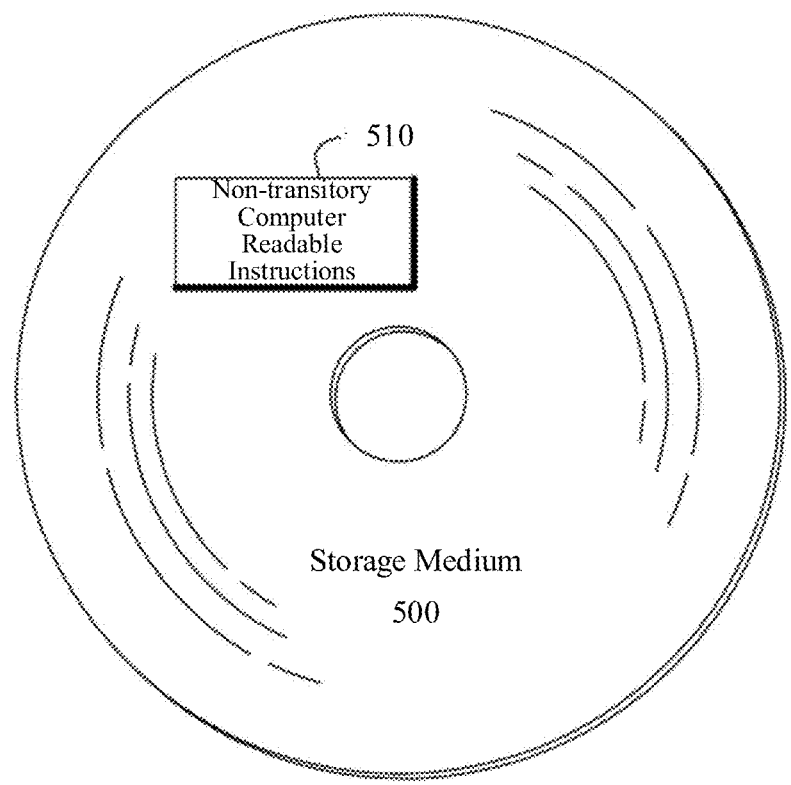
FIG. 14 is a schematic diagram of a storage medium provided by some embodiments of the present disclosure.

FIG. 14 is a schematic diagram of a storage medium provided by some embodiments of the present disclosure. As shown in FIG. 14, a storage medium 500 is configured to store non-transitory computer readable instructions 510. For example, upon the non-transitory computer readable instructions 510 being executed by a computer, one or more steps in the image processing method described above can be performed.

For example, the storage medium 500 can be applied to the image processing apparatus 300 described above. For example, the storage medium 500 can be the memory 320 in the image processing apparatus 300 shown in FIG. 12. For example, the related description of the storage medium 500 can refer to the corresponding description of the memory 320 in the image processing apparatus 300 shown in FIG. 12, which is not repeated here.

At least one embodiment of the present disclosure further provides a video processing method, which can process the input video based on a convolutional neural network to improve the image definition, realize real-time image quality enhancement, and has good processing effect and high processing efficiency.

Figure 15:
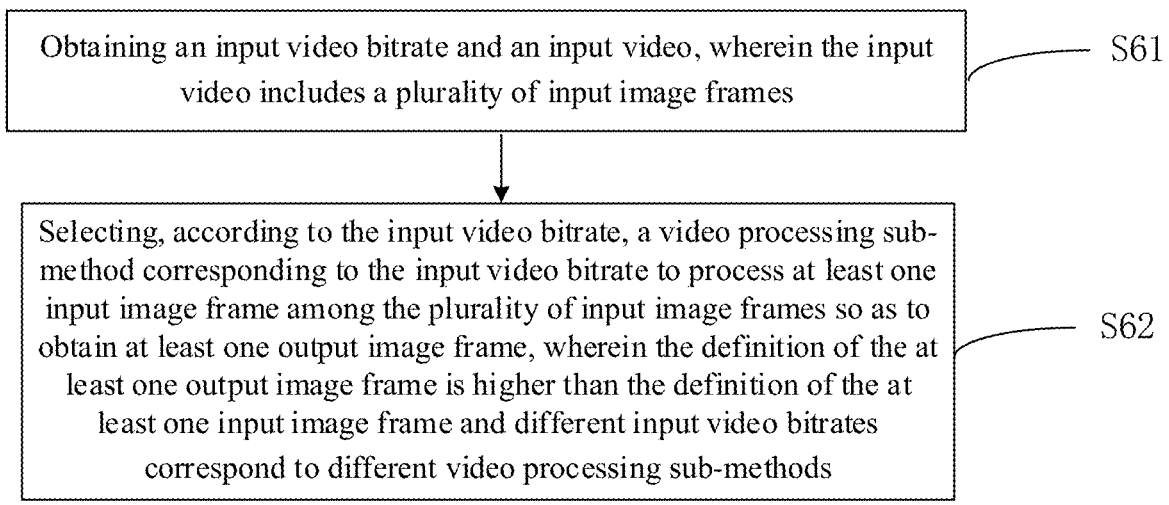
FIG. 15 is a schematic flowchart of a video processing method provided by some embodiments of the present disclosure.

FIG. 15 is a schematic flowchart of a video processing method provided by some embodiments of the present disclosure. For example, as shown in FIG. 15, the video processing method can include the following operations.

Step S61: obtaining an input video bitrate and an input video, in which the input video includes a plurality of input image frames; and Step S62: selecting, according to the input video bitrate, a video processing sub-method corresponding to the input video bitrate to process at least one input image frame among the plurality of input image frames so as to obtain at least one output image frame, in which the definition of the at least one output image frame is higher than the definition of the at least one input image frame.

For example, different input video bitrates correspond to different video processing sub-methods. Here, the "video processing sub-method" can be the image processing method described in any embodiment of the present disclosure, or can be a method for processing a video with a certain bitrate in the terminal device provided by any embodiment of the present disclosure. Related descriptions can refer to the foregoing contents, which may not be repeated here.

The following statements should be noted.
(1) The accompanying drawings involve only the structure (s) in connection with the embodiment(s) of the present disclosure, and other structure(s) can be referred to common design(s).
(2) In case of no conflict, the embodiments of the present disclosure and the features in the embodiment(s) can be combined with each other to obtain new embodiment(s).

What have been described above are only specific implementations of the present disclosure, and are not intended to limit the protection scope of the present disclosure, and the protection scope of the present disclosure should be based on the protection scope of the appended claims.

What is claimed is:
1. An image processing method, comprising:
receiving an input image; and
processing the input image by using a convolutional neural network to obtain an output image, wherein a definition of the output image is higher than a definition of the input image;
wherein processing the input image by using the convolutional neural network to obtain the output image comprises:
performing feature extraction on the input image to obtain a plurality of first images;

concatenating the input image and the plurality of first images to obtain a first image group, wherein the first image group comprises the input image and the plurality of first images;

performing the feature extraction on the first image group to obtain a plurality of second images;

fusing the plurality of second images and the plurality of first images to obtain a plurality of third images;

concatenating the input image and the plurality of third images to obtain a second image group, wherein the second image group comprises the input image and the plurality of third images; and performing the feature extraction on the second image group to obtain the output image.

2. The method according to claim 1, wherein a count of convolution kernels, used for the feature extraction on the input image, in the convolutional neural network is N, $12 \leq N \leq 20$, and N is an integer, a count of convolution kernels, used for the feature extraction on the first image group, in the convolutional neural network is M, $12 \leq M \leq 20$, and M is an integer, and a count of convolution kernels, used for the feature extraction on the second image group, in the convolutional neural network is 3.

3. The method according to claim 2, wherein $N=M=16$;

a size of the convolution kernels used for the feature extraction on the input image, a size of the convolution kernels used for the feature extraction on the first image group, and a size of the convolution kernels used for the feature extraction on the second image group are all 3×3;

an activation function used for the feature extractions in the convolutional neural network is $y=\max(0, x)$, and x represents an input of the activation function and y represents an output of the activation function; and the input image comprises a red channel input image, a green channel input image, and a blue channel input image, and the output image comprises a red channel output image, a green channel output image, and a blue channel output image.

4. The method according to claim 1, further comprising:

training a second neural network to be trained based on a first neural network which is pre-trained to obtain the second neural network which is trained, so as to obtain the convolutional neural network, wherein parameters of the first neural network are more than parameters of the second neural network, the first neural network which is pre-trained is configured to transform an original image having a first definition, which is input to the first neural network that is pre-trained, into a new image having a second definition, the second definition is greater than the first definition, the second neural network which is trained is the convolutional neural network, a network structure of the second neural network to be trained is same as a network structure of the convolutional neural network, and parameters of the second neural network to be trained are different from parameters of the convolutional neural network.

5. The method according to claim 4, wherein training the second neural network to be trained based on the first neural network which is pre-trained to obtain the second neural network which is trained, so as to obtain the convolutional neural network, comprises:

based on the first neural network which is pre-trained, the second neural network to be trained, and a discrimination network, alternately training the discrimination network and the second neural network to obtain the second neural network which is trained, so as to obtain the convolutional neural network.

6. The method according to claim 5, wherein training the discrimination network comprises:

inputting first sample data into the first neural network and the second neural network, respectively, so as to obtain first data output from the first neural network and second data output from the second neural network;

setting the first data to have a true value tag, inputting the first data with the true value tag into the discrimination network to obtain a first discrimination result, setting the second data to have a false value tag, and inputting the second data with the false value tag into the discrimination network to obtain a second discrimination result;

calculating a first loss function based on the first discrimination result and the second discrimination result; and adjusting parameters of the discrimination network according to the first loss function to obtain an updated discrimination network.

7. The method according to claim 6, wherein training the second neural network comprises:

inputting second sample data into the first neural network and the second neural network, respectively, so as to obtain third data output from the first neural network and fourth data output from the second neural network;

setting the fourth data to have a true value tag, and inputting the fourth data with the true value tag into the updated discrimination network to obtain a third discrimination result output from the discrimination network;

calculating an error function based on the third data and the fourth data, calculating a discrimination function based on the third discrimination result, and calculating a second loss function based on the error function and the discrimination function; and adjusting the parameters of the second neural network according to the second loss function to obtain an updated second neural network.

8. The method according to claim 7, wherein the second loss function is a weighted sum of the error function and the discrimination function.

9. The method according to claim 8, wherein a weight of the error function is in a range of 90 to 110, and a weight of the discrimination function is in a range of 0.5 to 2.

10. The method according to claim 7, wherein the first sample data and the second sample data is image data obtained based on a plurality of videos having a same bitrate.

11. The method according to claim 4, wherein training the second neural network to be trained based on the first neural network which is pre-trained to obtain the second neural network which is trained, so as to obtain the convolutional neural network, comprises:

inputting third sample data into the first neural network and the second neural network, respectively, so as to obtain fifth data output from the first neural network and sixth data output from the second neural network;

calculating a third loss function based on the fifth data and the sixth data; and adjusting the parameters of the second neural network according to the third loss function to obtain an updated second neural network.

12. The method according to claim 4, wherein the first neural network comprises a plurality of stages of down-sampling units and a plurality of stages of up-sampling units corresponding to the plurality of stages of down-sampling units, an output of each stage of down-sampling unit serves as an input of a next stage of down-sampling unit, and an input of each stage of up-sampling unit comprises an output of a stage of down-sampling unit corresponding to the stage of up-sampling unit and an output of a previous stage of up-sampling unit of the stage of up-sampling unit.

13. A terminal device, comprising a hardware development board,
wherein the hardware development board is deployed with a software development package, the software development package comprises a plurality of neural network modules, the plurality of neural network modules are obtained based on a plurality of convolutional neural networks, respectively, and different neural network modules are used to process video data with different bitrates,
the hardware development board comprises a central processing unit and a neural-network processing unit,
the central processing unit is configured to: invoke the software development package and select one of the neural network modules according to a bitrate of an input video, and control the neural-network processing unit to process the input video based on a neural network module that is selected, so as to obtain an output video,
a definition of the output video is higher than a definition of the input video,
wherein at least one neural network module of the plurality of neural network modules is configured to:
receive an input image frame of the input video; and
process the input image frame to obtain an output image frame of the output video, wherein a definition of the output image frame is higher than a definition of the input image frame, wherein processing the input image frame to obtain the output image frame of the output video comprises:
performing feature extraction on the input image frame to obtain a plurality of first output images;
concatenating the input image frame and the plurality of first output images to obtain a first output image group, wherein the first output image group comprises the input image frame and the plurality of first output images;
performing the feature extraction on the first output image group to obtain a plurality of second output images;
fusing the plurality of second output images and the plurality of first output images to obtain a plurality of third output images;
concatenating the input image frame and the plurality of third output images to obtain a second output image group, wherein the second output image group comprises the input image frame and the plurality of third output images; and
performing the feature extraction on the second output image group to obtain the output image frame.

14. The terminal device according to claim 13, wherein neural network modules corresponding to different convolutional neural networks are different.

15. The terminal device according to claim 14, wherein the plurality of convolutional neural networks are trained by using different sample data sets, the different sample data sets are obtained based on different video sets, each video set comprises a plurality of videos, videos in a same video set have a same bitrate, and videos in different video sets have different bitrates.

16. The terminal device according to claim 13, wherein the plurality of neural network modules are obtained based on performing parameter quantization on the plurality of convolutional neural networks.

17. A video processing method, comprising:
obtaining an input video bitrate and an input video, the input video comprising a plurality of input image frames; and
selecting, according to the input video bitrate, a video processing module corresponding to the input video bitrate to process at least one input image frame among the plurality of input image frames so as to obtain at least one output image frame, a definition of the at least one output image frame being higher than a definition of the at least one input image frame,
wherein different input video bitrates correspond to different video processing modules,
wherein the video processing modules are obtained by training convolutional neural networks using different sample data sets, the different sample data sets are obtained based on different video sets, each video set comprises a plurality of videos, videos in a same video set have a same bitrate, and videos in different video sets have different bitrates.

18. An image processing apparatus, comprising:
a processor; and
a memory, comprising one or a plurality of computer program modules,
wherein the one or plurality of computer program modules are stored in the memory and configured to be executed by the processor, and the one or plurality of computer program modules are configured to execute the image processing method according to claim 1.

* * * * *